(12) United States Patent
Gavan et al.

(10) Patent No.: US 6,601,048 B1
(45) Date of Patent: Jul. 29, 2003

(54) SYSTEM AND METHOD FOR DETECTING AND MANAGING FRAUD

(75) Inventors: John Gavan, Colorado Springs, CO (US); Kevin Paul, Colorado Springs, CO (US); Jim Richards, Omaha, NE (US); Charles A. Dallas, Colorado Springs, CO (US); Hans Van Arkel, Colorado Springs, CO (US); Cheryl Herrington, Monument, CO (US); Saralyn Mahone, Colorado Springs, CO (US); Terril J. Curtis, Pueblo West, CO (US); James J. Wagner, Larkspur, CO (US)

(73) Assignee: MCI Communications Corporation, Washington, DC (US)

( * ) Notice: Subject to any disclaimer, the term of this patent is extended or adjusted under 35 U.S.C. 154(b) by 0 days.

(21) Appl. No.: 08/928,851

(22) Filed: Sep. 12, 1997

(51) Int. Cl.[7] ................................................. G06N 5/04
(52) U.S. Cl. ............................ 706/10; 706/62; 379/111
(58) Field of Search ...................... 706/62, 10; 379/111

(56) References Cited

U.S. PATENT DOCUMENTS

| 4,154,983 A | 5/1979 | Pedersen |
| 4,464,543 A | 8/1984 | Kline et al. |
| 4,805,209 A | 2/1989 | Baker, Jr. et al. |

(List continued on next page.)

FOREIGN PATENT DOCUMENTS

WO  96/31043  10/1996

OTHER PUBLICATIONS

"Advanced Information Management", META Group, Inc., Aug. 29, 1994.

(List continued on next page.)

Primary Examiner—Wilbert L. Starks, Jr.

(57) ABSTRACT

A system, method and computer program product for processing event records. The present invention includes a detection layer, an analysis layer, an expert systems layer and a presentation layer. The layered system includes a core infrastructure and a configurable, domain-specific implementation. The detection layer employs one or more detection engines, such as, for example, a rules-based thresholding engine and a profiling engine. The detection layer can include an AI-based pattern recognition engine for analyzing data records, for detecting new and interesting patterns and for updating the detection engines to insure that the detection engines can detect the new patterns. In one embodiment, the present invention is implemented as a telecommunications fraud detection system. When fraud is detected, the detection layer generates alarms which are sent to the analysis layer. The analysis layer filters and consolidates the alarms to generate fraud cases. The analysis layer preferably generates a probability of fraud for each fraud case. The expert systems layer receives fraud cases and automatically initiates actions for certain fraud cases. The presentation layer also receives fraud cases for presentation to human analysts. The presentation layer permits the human analysts to initiate additional actions.

52 Claims, 16 Drawing Sheets

U.S. PATENT DOCUMENTS

| | | |
|---|---|---|
| 5,003,584 A | 3/1991 | Benyacar et al. |
| 5,048,079 A | 9/1991 | Harrington et al. |
| 5,159,698 A | 10/1992 | Harrington et al. |
| 5,233,642 A | 8/1993 | Renton |
| 5,263,120 A * | 11/1993 | Bickel .......................... 706/62 |
| 5,291,547 A | 3/1994 | Boatwright et al. |
| 5,311,572 A | 5/1994 | Friedes et al. |
| 5,313,641 A | 5/1994 | Simcoe et al. |
| 5,325,290 A | 6/1994 | Cauffman et al. |
| 5,327,144 A | 7/1994 | Stilp et al. |
| 5,335,278 A | 8/1994 | Matchett et al. |
| 5,345,595 A | 9/1994 | Johnson et al. |
| 5,375,244 A * | 12/1994 | McNair ...................... 395/726 |
| 5,418,844 A | 5/1995 | Morrisey et al. |
| 5,432,845 A | 7/1995 | Burd et al. |
| 5,463,681 A | 10/1995 | Vaios et al. |
| 5,475,746 A | 12/1995 | Miller et al. |
| 5,495,521 A * | 2/1996 | Rangachar ............... 379/93.04 |
| 5,504,810 A | 4/1996 | McNair |
| 5,506,893 A | 4/1996 | Buscher et al. |
| 5,515,425 A | 5/1996 | Penzias et al. |
| 5,515,427 A | 5/1996 | Carlsen et al. |
| 5,517,555 A | 5/1996 | Amadon et al. |
| 5,574,782 A | 11/1996 | Baird et al. |
| 5,586,175 A | 12/1996 | Hogan et al. ............... 379/112 |
| 4,002,848 A | 1/1997 | Stein |
| 5,592,530 A | 1/1997 | Brockman et al. |
| 5,596,632 A * | 1/1997 | Curtis et al. ................ 379/189 |
| 5,602,906 A | 2/1997 | Phelps |
| 5,606,600 A | 2/1997 | Elliot et al. .................. 379/112 |
| 5,627,886 A * | 5/1997 | Bowman .................... 379/111 |
| 5,640,446 A * | 6/1997 | Everett et al. .............. 379/115 |
| 5,768,354 A | 6/1998 | Lange et al. |
| 5,790,645 A | 8/1998 | Fawcett et al. |
| 5,805,686 A | 9/1998 | Moller et al. |
| 5,854,834 A | 12/1998 | Gottlieb et al. |
| 5,875,236 A | 2/1999 | Jankowitz et al. |
| 5,907,602 A | 5/1999 | Peel et al. |
| 5,963,625 A | 10/1999 | Kawecki et al. |
| 6,208,720 B1 | 3/2001 | Curtis et al. |

OTHER PUBLICATIONS

Calem, Robert E., "To Catch A Thief", *Forbes ASAP*, pp. 44–45, date unknown.

Curet, O., The application of case–based reasoning to assist accountant in identifying top management fraud; a study of the problem domain and the methodological issues in the development, implementation and evaluation of a case-based learning and reasoning tool, Case Based Reasoning: Prospects for Applications, IEE Colloquium on, 1995, pp. 8/1–8/4.

Garner, B.; Chen, F., Hypothesis generation paradigm for fraud detection, TENCON '94 . IEEE Region 10's Ninth Annual International Conference. Theme: Frontiers of Computer Technology Proceedings of 1994, Aug. 22–26, pp. 197–201 vol. 1.

Fawett, T., "Adaptive Fraud Detection", Journal of Data Mining and Knowledge Discovery, Copyright 1997, Kluwer Academic Publishers, Norwell, MA, vol. 1 1997, pp. 291–316.

Scarfe, R.T.; Shortland, R.J., Data Mining Applications in BT, Knowledge Discovery in Databases, [IEE Colloquium on], 1995, pp. 5/1–5/4.

Sternberg, M.; Reynolds, R.G., Using cultural algorithms to support re–engineering of rule–based expert systems in dynamic performance environments: a case study in fraud detection, Evolutionary Computation, IEEE Transactions on, vol.: 14, Nov. 1997, pp.: 225–243.

Watkins, P.R.; Lin, T.W.; O'Leary, D.E., AI integration for enchanced decision support, Systems Sciences, 1992. Proceedings of the Twenty–Fifth Hawaii International Conference on, vol.: III, Jan. 7–10, 1992, pp.: 133–144 vol. 3.

* cited by examiner

Alarm Consolidation, Correlation and Reduction

Fraud Case Processing in an Expert System Layer

SYSTEM AND METHOD FOR DETECTING AND MANAGING FRAUD

CROSS-REFERENCE TO RELATED APPLICATIONS

This patent application is related to the following commonly owned, copending U.S. patent application:

"Network Information Concentrator," Ser. No. 08/426,256, filed Apr. 21, 1995, now U.S. Pat. No. 5,854,834, incorporated herein by reference.

BACKGROUND OF THE INVENTION

1. Field of the Invention

The present invention relates to processing event records, such as, for example, telecommunications network event records.

2. Related Art

As the telecommunications industry rapidly grows, telecommunications fraud also grows. In the United States alone, telecommunication fraud is estimated to have cost $3 billion in 1995. Telecommunications service providers have experienced difficulty in keeping up with new methods of fraud. As soon as service providers implement new systems to detect current methods of fraud, criminals innovate new methods.

Current methods of fraud are targeted at all types of services. Such services and corresponding fraud include use of calling cards, credit cards, customer premise equipment (CPE), including private branch exchanges (PBX), dial 1+, 800 inbound, and cellular calls. In addition, international dialing is a frequent target of fraud because of its high price of service. Subscription fraud, where a customer subscribes to a service, such as 800 or Dial 1, and then never pays, is also a frequent target of fraud.

Existing methods of detecting fraud are based primarily on setting predetermined thresholds and then monitoring service records to detect when a threshold has been exceeded. Parameters for such thresholds include total number of calls in a day, number of calls less than one minute in duration, number of calls more than 1 hour in duration, calls to specific telephone numbers, calls to specific countries, calls originating from specific telephone numbers, etc. Many parameters can be used to tailor a particular thresholding system for certain customers or services.

These thresholds must be manually programmed, which is labor intensive and time consuming. Moreover, these thresholds are generally subjective and not directly based upon empirical data. In addition, manually programmed thresholds are static and thus do not adjust to changing patterns of fraud. They are therefore easy for criminals to detect and circumvent. Also, since such thresholds must be set conservatively in order to detect most fraud, they are frequently exceeded by non-fraudulent calls, contributing to high rates of false alarms.

When a threshold is exceeded, an alarm is triggered and presented to an analyst, who must then analyze the alarm to determine if it properly reflects fraud. The analyst must query many sources of data, such as customer payment history and service provisioning data, to assess the probability of fraud. The analyst must also assess several different alarms and correlate them to determine if a case of fraud is spanning across services. This manual process of analyzing and correlating is time consuming, labor intensive, highly subjective and prone to error.

When it is determined that fraud has occurred, the analyst must then select an appropriate action and then initiate it. Such actions can include deactivating a calling card or blocking an ANI (Automatic Number Identifier) from originating calls.

Because current systems of fraud management are rigid and generally not configurable for other service providers or industries, new rules, algorithms, routines, and thresholds must constantly be re-programmed.

What is needed is a configurable system, method and computer program product for detecting and automatically acting upon new and evolving patterns and that can be implemented in a variety of applications such as, for example, telecommunications fraud, credit card and debit card fraud, data mining, etc.

SUMMARY OF THE INVENTION

The present invention is a system, method and computer program product for processing event records. The present invention includes a detection layer for detecting certain types of activity, such as, for example, thresholds and profiles, for generating alarms therefrom and for analyzing event records for new patterns. The present invention also includes an analysis layer for consolidating alarms into cases, an expert systems layer for automatically acting upon certain cases and a presentation layer for presenting cases to human operators and for permitting human operator to initiate additional actions.

The present invention combines a core infrastructure with configurable, user-specific, or domain-specific, implementation rules. The core infrastructure is generically employed regardless of the actual type of network being monitored. The domain-specific implementation is provided with user specific data and thus provides configurability to the system.

The domain-specific implementation can include a user-configurable database for storing domain-specific data. The user-configurable database can include one or more databases including, for example, flat files databases, object oriented databases, relational database, etc. User-configurable data can include conversion formats for normalizing records and dispatch data for specifying which fields of normalized network event records are to be sent to different processing engines.

In one embodiment, the present invention is implemented as a telecommunications fraud detection system in which the detection layer receives network event records from a telecommunications network and detects possible fraudulent use of the telecommunications network. In another embodiment, the present invention is implemented in a credit card and/or debit card fraud detection system. In yet another embodiment, the present invention is implemented in a data mining system or a market analysis system.

Regardless of the implementation-specific embodiment, event records can come from a variety of sources. Thus, event records are preferably normalized event records prior to acting upon them. Normalized event records are dispatched to one or more processing engines in the detection layer, depending upon the specific embodiment employed. The normalizing and dispatching functions include a core infrastructure and a configurable, domain-specific implementation.

The detection layer can employ a plurality of detection engines, such as, for example, a thresholding engine, a profiling engine and a pattern recognition engine. One or more of the detection engines can enhance event records prior to acting upon them. Enhancement can include accessing external databases for additional information related to a network event record. For example, in a telecommunications fraud detection system, enhancement data can include, for example, bill paying history data for a particular caller.

A thresholding engine constantly monitors normalized event records to determine when thresholds have been exceeded. When a threshold is exceeded, an alarm is generated. In a telecommunications fraud detection implementation, thresholding can be based on pre-completion call data, as well as conventional post-call data.

The thresholding engine includes a core infrastructure and a configurable, domain-specific implementation. The core infrastructure includes configurable detection algorithms. The domain-specific implementation includes user-specific thresholding rules. The rules can be easily tailored for specific uses and can be automatically updated, preferably with updates generated by a pattern recognition engine. Thus, the domain-specific implementation of the thresholding engine can employ complex thresholding rules that compare and aggregate various data and network event records. The underlying core infrastructure provides scalability to the configurable domain-specific implementation.

A profiling engine constantly monitors normalized event records to determine when a departure from a standard profile has occurred. When a departure from a profile is detected, a corresponding alarm is generated. In a telecommunications fraud detection implementation, profiling can be based on pre-completion call data, as well as conventional post-call data.

The profiling engine includes a core infrastructure and a configurable, domain-specific implementation. The domain-specific implementation provides user-specific profiles. The profiles can be easily tailored for specific uses and can be automatically updated, preferably with updates that are generated by a pattern recognition engine. The core infrastructure provides scalability to the configurable domain-specific implementation.

A pattern recognition engine preferably employs artificial intelligence to monitor event records and to determine whether any interesting or unusual patterns develop. In a telecommunications fraud detection implementation, interesting or unusual patterns can indicate fraudulent or non-fraudulent use of the telecommunications network. The pattern recognition engine uses the new patterns to dynamically update both a rules database for parametric thresholding and a profile database for profile analysis.

The pattern recognition engine includes a core infrastructure and a configurable, domain-specific implementation. The core infrastructure includes an AI pattern analysis processor for analyzing records and a call history database for storing a history of prior records. The actual contents of the call history database are developed from actual use of the system and are, thus, part of the domain-specific implementation.

By implementing AI for pattern recognition, thresholds are dynamic and can be adjusted in accordance with changing patterns of fraud. Patterns and thresholds are based on real-time event data, as well as historical data derived from external sources. In addition, pattern recognition data is fed to the profiling engine, which can then establish profiles that represent normal and fraudulent calling patterns. Varying departures from these profiles will trigger an alarm. In a telecommunications fraud detection implementation, a probability of fraud is calculated for each alarm.

The analysis layer receives alarms from the detection layer and performs several analysis functions to generate cases. In a fraud detection implementation, the analysis layer correlates alarms generated from common network incidents, builds cases of suspected fraud from individual alarms and prioritizes cases according to their probability of fraud so that there are likely to be fewer false positives at the top of the priority list than at the bottom. The analysis layer includes a core infrastructure and a configurable, domain-specific implementation.

The analysis layer employs a fraud case builder to correlate multiple alarms that are generated by one or more detection layer engines. For example, a single event can violate one or more thresholding rules while simultaneously violating one or more profiling rules. The alarms can be consolidated into a single fraud case which lists each violation. The fraud case builder can also correlate over time. Thus, an event subsequent to the event listed above can be related to earlier events.

For example, a telephone call that is charged to a particular credit card can violate a threshold rule pertaining to the length of a call. A subsequent call which is charged to that same credit card can violate the same rule or other thresholding rules or profiles. The fraud case builder can correlate all such calls into a fraud case indicating all of the violations associated with the credit card. Depending on the implementation layer analysis rules, the fraud case builder can also generate additional fraud cases based upon the calling number, the called number, etc.

The domain-specific implementation of the analysis layer includes a configurable informant for retrieving data from external systems for use by an enhancer. A configuration database indicates the data necessary for enhancement. Preferably, the configuration database is a user-configurable database including one or more databases such as, for example, flat files databases, object oriented databases, relational database, etc. The domain-specific implementation also includes rules for analyzing alarms. The rules are user specific and can be tailored as necessary.

The expert system layer receives cases from the analysis layer, performs automated analysis of cases and automates decision support functions. The expert system layer includes a prioritizer for prioritizing cases, such as fraud cases, for example, and an informant for retrieving additional data from external systems. The informant interfaces with external systems in formats native to the external systems. The expert system layer informant is similar to the informants that are employed by the detection and the analysis layers. External systems provide data that can be used in determining whether a fraud case is so obvious that automatic action, such as terminating an account, is warranted.

The expert system layer includes an enforcer for interfacing with external action systems. For example, in a fraud detection implementation, when the prioritizer determines that automatic action is required to stop a fraudulent activity, the enforcer sends necessary commands to one or more external action systems which will implement the action. The enforcer includes a configurable, domain-specific implementation that includes user-specific interfacing protocols for interfacing with external action systems in formats native to the external systems.

The expert system layer includes a core infrastructure and a configurable, configurable, domain-specific implementation. The domain-specific implementation includes prioritization rules for use by the prioritizer for prioritizing cases. These rules are generally user-specific and are typically based on prior experience. The domain-specific implementation also includes action rules for use by the prioritizer to determine what action to take on fraud cases.

The presentation layer receives cases for presentation to and analysis by human operators. Human operators can initiate action independent of any action automatically initiated by the expert system layer. The presentation layer includes a core infrastructure and a configurable, domain-specific implementation.

The present invention is scalable, configurable, distributed and redundant and can be implemented in software, firmware, hardware, or any combination thereof. The present invention employs Artificial Intelligence (AI) and Expert System technologies within a layered logical systems architecture. Thus, configurability of detection criteria, portability to multiple enterprises and ability to detect new methods of fraud are all enhanced. In addition, dynamic thresholds and automated analysis are provided.

Further features and advantages of the present invention, as well as the structure and operation of various embodiments of the present invention, are described in detail below with reference to the following drawings.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art to make and use the invention.

The present invention is described with reference to the accompanying Figures, wherein.

Figure 1:
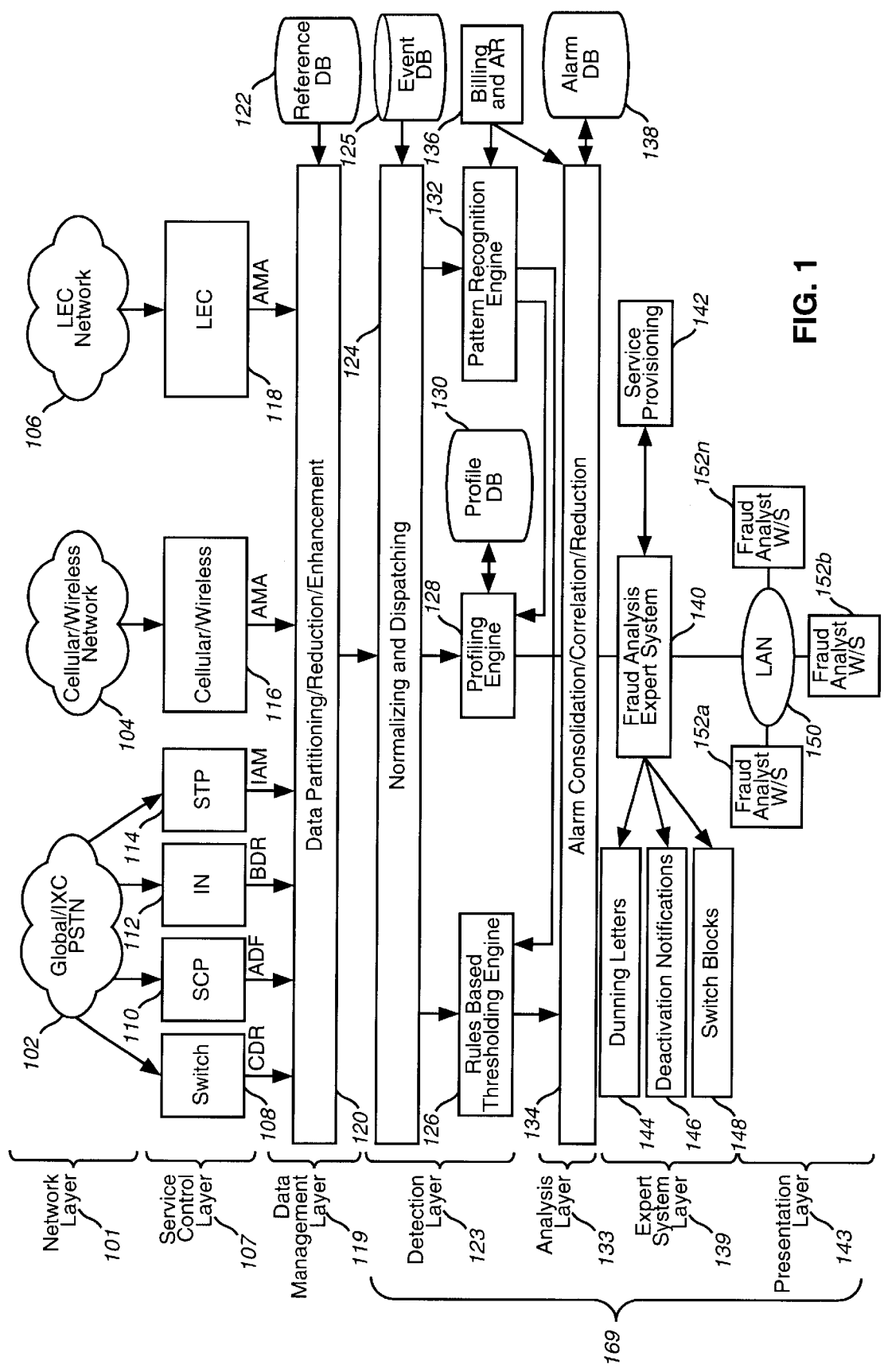
FIG. 1 is a block diagram of a multi-layer event record detection and processing system, including a detection layer, an analysis layer, an expert system layer and a presentation layer, implemented as a telecommunications fraud detection system.

The present invention will now be described with reference to the accompanying drawings. In the drawings, like reference numbers typically indicate identical or functionally similar elements. Additionally, the left-most digit(s) of a reference number typically identifies the drawing in which the reference number first appears.

DETAILED DESCRIPTION OF THE PREFERRED EMBODIMENTS

TABLE OF CONTENTS

I. Overview
II. Example Environment
III. Processing Event Records
    A. Detection Layer
        1. Normalization and Dispatching
        2. Rules-Based Thresholding
        3. Profiling
        4. Pattern Recognition
    B. Analysis Layer
    C. Expert System Layer
    D. Presentation Layer
IV. Conclusions

OVERVIEW

The present invention is a configurable system, method and computer program product for detecting and automatically acting upon new and evolving patterns in, for example, telecommunications fraud detection, data mining, market analysis (i.e., to segment strong potential customers and to detect consumer purchasing patterns), etc. The present invention is a multi-layered, scalable, configurable, distributed and redundant system that can be implemented in software, firmware, hardware or any combination thereof. The present invention can be implemented as a portable software suite. The multiple layer architecture includes a detection layer for detecting thresholds, profiles and patterns for generating alarms, an analysis layer for analyzing alarms and for consolidating alarms into cases, an expert system layer for acting upon cases and a presentation layer for presenting cases to human users.

Figure 13:
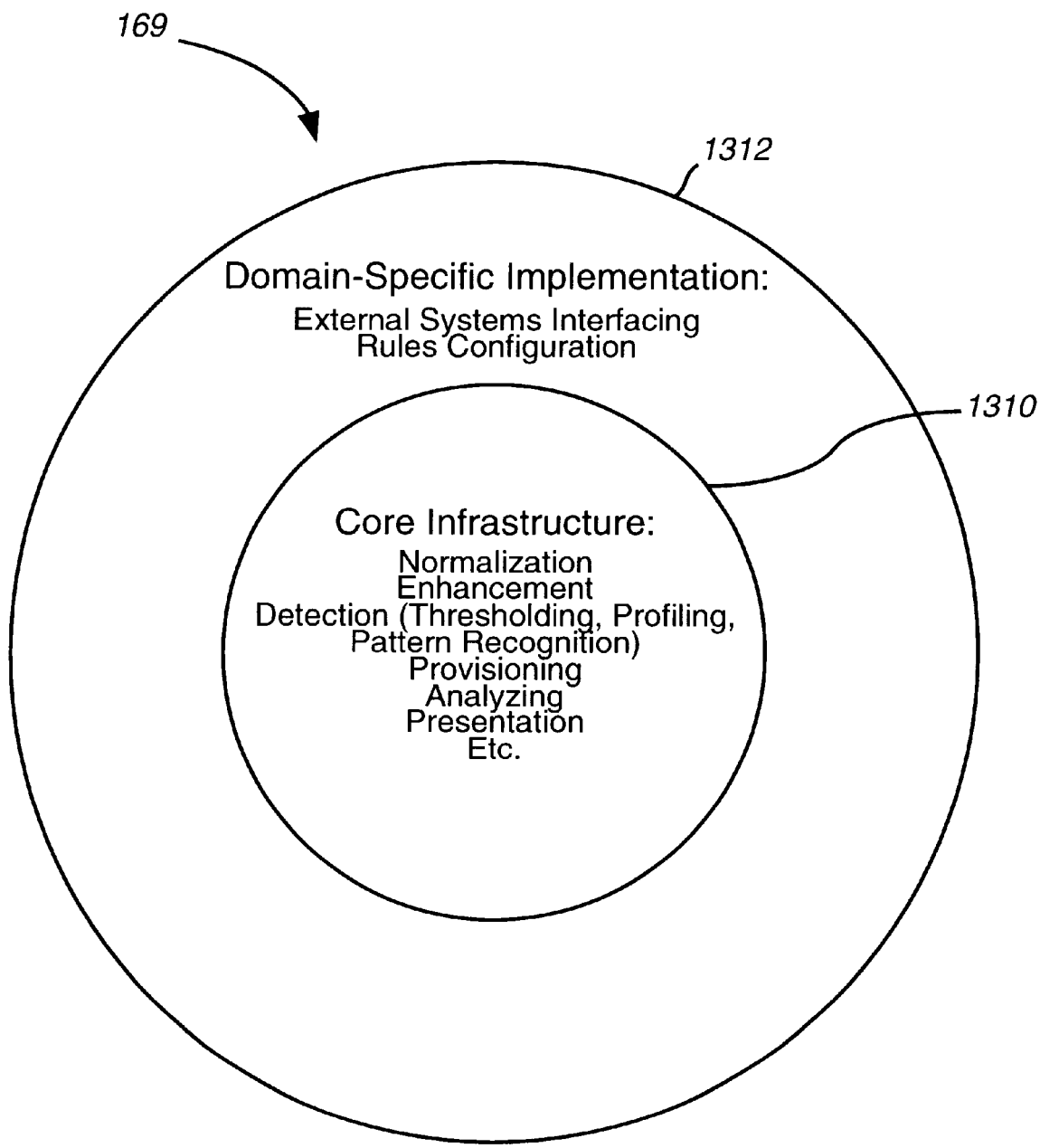
FIG. 13 is a block diagram illustrating a relationship between a core infrastructure and a user-specific, or domain-specific, implementation of the present invention.

Referring to FIG. 13, the invention includes a core infrastructure 1310 that permits each layer to be implemented in a variety of applications without alteration. The invention also includes a configurable, rules-based, user-specific, or domain-specific, implementation 1312 that permits each layer to be tailored for specific applications.

Domain-specific implementation 1312 permits the present invention to be configured for use in a variety of applications such as, for example, telecommunications fraud, credit card and debit card fraud, data mining, etc. Core infrastructure 1310 and domain-specific implementation 1312 can be implemented as software, firmware, hardware or any combination thereof.

Core infrastructure 1310 includes elements that are required, regardless of the actual implementation environment. Domain-specific implementation 1310 includes user-specific data and functions such as thresholding rules, profiles, pattern recognition rules, alarm correlation and reduction rules, fraud case prioritization and action rules, presentation parameters and external system interacting parameters. Core infrastructure 1310 can be used in a variety of applications, without redesign. Domain-specific implementation 1312 permits substantial tailoring of the system to user-specific situations.

Domain-specific implementation 1312 includes configurable rules to provide flexibility. Configurable rules include event recognition rules, event normalization rules, enhancement rules, detection rules, analysis rules, prioritization rules, presentation rules, and dispatching rules, including provisioning rules.

Event recognition rules specify how to recognize incoming events. Event normalization rules specify how to normalize the events. Provisioning rules specify how to map sets of detection rules to events, such as, for example, by customer or by product. Enhancement rules specify how to derive new information from existing information, such as how to derive product identification from an incoming event.

Detection rules specify how to generate alarms in reaction to events of suspected fraud. Detection rules can include thresholding rules and profiles of use. Detection rules also specify alarm priorities for alarms generated in the detection layer, based on the type of rule violated.

Analysis rules further prioritize alarms and specify how to correlate alarms into fraud cases. Prioritization rules specify how to prioritize cases for automatic actions. Presentation rules specify how to display information to users. Dispatching rules, which include provisioning rules, are used for provisioning data to a rule set, partitioning data and deciding which engine to send data to.

Rules can be created or modified and take effect while the system is running. When a rule is created or modified, it will be applied to new events that arrive at the system. Generally, rules are not applied to previously received events. When a rule is deleted, its deletion does not affect values or entities that were generated from the rule. For example, deleting an alarm type definition rule does not affect existing alarms.

Domain-specific implementation 1312 also includes configurable values. These can include, but are not limited to, one or more of the following values.

A database time-out variable specifies a maximum amount of time to wait for a response from a database. For example, if a request for data is sent to an external database, the system will wait only for the time-out period. Configurable rules will determine what event to take upon failure to receive a response within the time-out period.

An expected volume of data from a data management layer variable specifies the number of messages which can be received and the time period over which to measure this expected number of messages.

A time-out wait period for data from a data management layer variable specifies the maximum time to wait for a message from the data management layer before sending a network alarm.

A maximum age for arriving events variable specifies the maximum time between event creation and event arrival from a data management layer. This variable can be used to increment a counter of old events. A maximum number of old events variable specifies the number of events older than the maximum age for arriving events. Typically, a network management message is generated whenever this variable is exceeded.

A maximum number of invalid events variable specifies the maximum number of invalid events which can be received from a data management layer. Typically, a network management message is generated whenever this variable is exceeded.

A case-high priority threshold variable specifies a priority level above which cases are monitored if they go unprocessed. A maximum case unprocessed time variable specifies the maximum time that a case above the case-high priority threshold can go unprocessed before being reportable.

A rules performance measurement time period variable specifies a time period over which rules performance will be measured. This variable is typically used for reporting purposes.

A variety of purge time variables specify time periods for storing a variety of data items. Data items can include invalid events, valid and normalized events, alarms, cases determined to be fraudulent, cases determined to be other than fraudulent and actions taken.

II. EXAMPLE ENVIRONMENT

The present invention can be configured for a variety of applications, such as, for example, telecommunications fraud detection, credit card and debit card fraud detection, data mining, marketing analysis, etc. The present invention is described below as implemented as a telecommunications fraud detection system. The examples that are described herein are provided to assist in the description of the present invention, not to limit the present invention.

Telecommunications systems can include any of a variety of types of telecommunications networks. Several such telecommunications networks are depicted in network layer 101 of FIG. 1. Network layer 101 can include a Global/Inter-Exchange Carrier (IXC) public switch telephone network (PSTN) 102 which can include conventional IXC networks with domestic and global coverage, such as those of MCI Telecommunications and British Telecom (BT). A variety of services can be supported by such networks. Network layer 101 can also include cellular and wireless networks 104, which offer conventional analog and digital cellular services. Local exchange networks (LEC) 106, such as those operated by Regional Bell Operating Companies (RBOCs), independent local telephone companies, and Competitive Access Providers (CAPs) can also be included.

A service control layer 107 offers and manages various telecommunications services and creates service records which contain data representing each instance of a particular service offering. For example, service control layer 107 can support Global/Inter-Exchange Carrier PSTN 102 with a plurality of switches 108 for issuing Call Detail Records (CDR) for each voice and data call it processes. In addition, a plurality of service control points (SCP) 110 can be used to provide data and intelligence for enhanced services, such as virtual network or 800 call routing. SCPs issue records for each transaction they process. These records are referred to herein as Application Data Field (ADF) records.

Intelligent networks (IN) 112 can be provided for enhanced service offerings, such as operator services. Components from INs 112 can issue records, commonly referred to as Billing Detail Records (BDR), and intelligent services bad billed number (BBN) records, for such services. In addition, completed IN operator assisted calls can be sent from a network information concentrator (NIC) as enhanced operator service records (EOSR), which include an ISN BDR which is matched with a switch format (EOSR).

Signal transfer points (STP) 114 can be employed for signaling networks, referred to as SS7 networks, which use these signal transfer points (STP) 114 for processing call signaling messages. STPs 114 issue messages, such as, for example, Initial Address Messages, which contain data pertaining to a call being carried by the IXC network.

Service control layer 107 can also employ cellular service control components 116 for issuing standard AMA records for cellular calls handled by cellular network 104. Service control layer 107 can include LEC service control components 118 of a LEC network 106 for issuing AMA records for local calls and the local exchange of long-distance calls.

A single call can traverse multiple networks and generate multiple call records. ADFs, BDRs and IAMs can be issued prior to a call completing. CDRs, EOSRs and AMAs are issued after a call completes.

A data management layer 119 collects the various service records from the service control components and processes them to produce network event records that can be used by a variety of systems. Processing of data to produce network event records can include partitioning data among various distributed processors, reducing data by eliminating redundancy and consolidating multiple records for the same call, and enhancing data by augmenting records with pertinent data from external systems.

Data management layer 119 can be implemented in a variety of manners and can include a data partitioning, reduction and enhancement component 120. Preferably, component 120 is a Network Information Concentrator (NIC), as specified and claimed in co-pending U.S. application, Ser. No. 08/426,256, incorporated herein by reference in its entirety. NIC 120 can utilize one or more reference databases 122 to provide external data for enhancement. External reference data can include customer identification codes, service type codes and network element codes.

Typically, each of the telecommunications networks within network layer 101 can handle or process any of a variety of types of calls such as calling card calls, credit card calls, customer premise equipment (CPE) calls, dial 1+ calls, toll free 800 calls and cellular calls. They can also include credit card and debit card transactions. Each of these types of calls are subjected to fraudulent use. Thus, each of the telecommunications networks within network layer 101 are affected by fraud.

III. Processing Event Records

The present invention provides a multi-layered system, method and computer program product for detecting and acting upon data patterns and thresholds. When implemented as a telecommunications fraud detection system for detecting and acting upon fraud in one or more telecommunications networks, the present invention detects fraud by comparing network event records with thresholding rules and profiles. Violations result in the generation of alarms. Multiple alarms are correlated into fraud cases based on common aspects of the alarms, thus reducing the amount of analysis which must be performed on suspected incidents of fraud.

The system automatically acts upon certain cases of detected fraud to reduce losses stemming therefrom. In addition, live analysts can initiate additional actions. In a parallel operation, calling patterns are analyzed via network event records to discern new methods or patterns of fraud. From these newly detected methods of fraud, new thresholds and profiles are automatically generated for protecting the telecommunications system.

Figure 2:
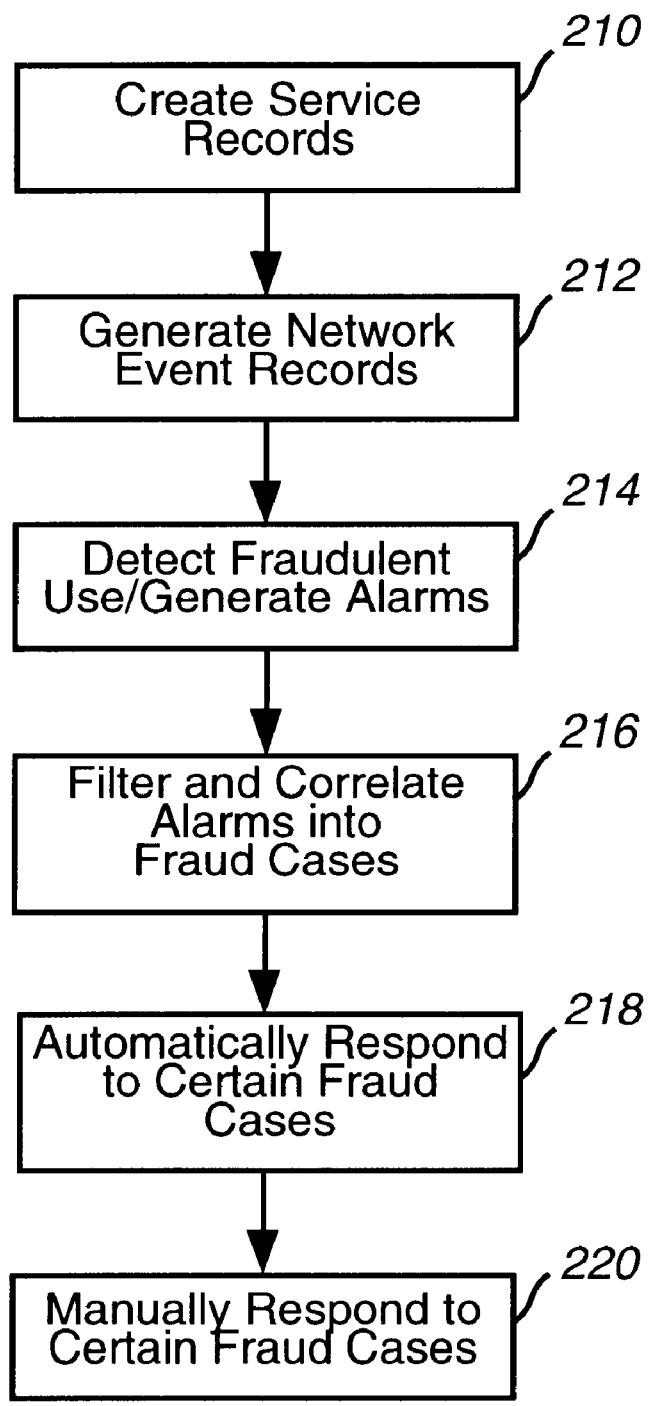
FIG. 2 is a high-level process flowchart illustrating a method for detecting and acting upon fraud in a telecommunications system.

Referring to FIG. 1, the present invention is illustrated as implemented as a fraud detection system 169. The present invention includes a detection layer 123, an analysis layer 133, an expert systems layer 139 and a presentation layer 143. In FIG. 2, a high-level process flowchart illustrates a method of detecting and handling fraud in a telecommunications system, such as that shown in FIG. 1. The process can be performed with software, firmware, hardware, or any combination thereof.

The process begins at step 210, where service records are generated by service control layer 107 for calls handled by the telecommunications systems in network layer 101. Service record formats and the data contained therein vary according to the type of call and the network equipment which handle a particular call, as described above. Because a single call can traverse multiple networks, a single call can generate multiple call records.

In step 212, service records are processed by data management layer 119 to generate network event records. This processing includes partitioning data among various distributed processors, reducing data by eliminating redundancy and consolidating multiple records for the same call, and enhancing data by augmenting records with pertinent data from external systems.

In step 214, network event records are analyzed by detection layer 123 for possible fraud. Step 214 is further detailed in the flowchart of FIG. 4, as described below.

Detection layer 123 specifies and executes tests to detect fraudulent use of network layer 101 services. Detection layer 123 is part of the infrastructure and is scalable and distributed with a configurable component to allow for customization in accordance with user requirements. Preferably, detection layer 123 includes three classes of processing engines, which are three distinct but related software processes, operating on similar hardware components. Preferably, these three classes of engines include a rules-based thresholding engine 124, a profiling engine 128 and a pattern recognition engine 132. These scalable and distributed engines can be run together or separately and provide the system with unprecedented flexibility.

A normalizing and dispatching component 124 can be employed to normalize network event records and to dispatch the normalized records to the various processing engines. Normalization is a process or processes for converting variously formatted network event records into standardized formats for processing within detection layer 123. Preferably, the normalizing process is dynamic in that the standardized formats can be varied according to the needs of the user.

Dispatching is a process which employs partitioning rules to pass some subset of the normalized network event records to particular paths of fraud detection and learning. Thus, where a particular processing engine requires only a subset of the available information, time and resources are conserved by sending only the necessary information.

Rules-based thresholding engine 124 constantly reads real-time network event records from network information concentrator 120 and compares these records to selected thresholding rules. If a record exceeds a thresholding rule, the event is presumed fraudulent and an alarm is generated. Thresholding alarms are sent to analysis layer 133.

Profiling engine 128 constantly reads real-time network event records from network information concentrator 120 and from other possible data sources which can be specified in the implementation layer by each user architecture. Profiling engine 128 then compares event data with appropriate profiles from a profile database 130. If an event represents a departure from an appropriate profile, a probability of fraud is calculated based on the extent of the departure and an alarm is generated. The profiling alarm and the assigned probability of fraud are sent to an analysis layer 133.

Preferably, in step 214, network event records are also analyzed in real-time by an artificial intelligence-based pattern recognition engine 132. This AI analysis will detect new fraud profiles so that threshold rules and profiles are updated dynamically to correspond to the latest methods of fraud.

Pattern recognition engine 132 permits detection layer 123 to detect new methods of fraud and to update the fraud detecting engines, including engines 126 and 128, with new threshold rules and profiles, respectively, as they are developed. In order to detect new methods of fraud and to generate new thresholds and profiles, pattern recognition engine 132 operates on all network event records including data from network information concentrator 120 through all other levels of the system, to discern anomalous call patterns which can be indicative of fraud.

Pattern recognition engine 132 collects and stores volumes of event records for analyzing call histories. Utilizing artificial intelligence (AI) technology, pattern recognition engine 132 analyzes call histories to learn normal patterns and determine if interesting, abnormal patterns emerge. When such an abnormal pattern is detected, pattern recognition engine 132 determines if this pattern is to be considered fraudulent.

AI technology allows pattern recognition engine 132 to identify, using historical data, types of patterns to look for as fraudulent. Pattern recognition engine 132 also uses external data from billing and accounts receivable (AR) systems 136 as references to current accumulations and payment histories. These references can be applied to the pattern recognition analysis process as indicators to possible fraud patterns.

Once pattern recognition engine 132 has established normal and fraudulent patterns, it uses these results to modify thresholding rules within the thresholding engine 226. For example, pattern recognition 132 can determine that credit card calls to a specific country, which exceed 50 minutes in length, are fraudulent 80% of the time. Pattern recognition engine 132 can then modify a thresholding rule within thresholding engine 126 which will generate an alarm if event data is received which reflects that particular pattern. Thus, by dynamically modifying threshold rules, the system is able to keep up with new and emerging methods of fraud, thereby providing a key advantage over conventional parametric thresholding systems for fraud detection.

Similarly, once normal and fraudulent patterns have been established by pattern recognition engine 132, pattern recognition engine 132 updates the profiles within the profile database 130. This allows profiles to be dynamically modified to keep up with new and emerging methods of fraud.

In step 216, alarms are filtered and correlated by analysis layer 133. For example, suppose a threshold rule generates an alarm if more than ten credit card calls charged to a single credit card are made within a one hour time frame. Suppose also that another threshold rule generates an alert if more than one call is charged to a particular credit card at the same time. If ten calls are placed within one hour using the same single credit card, and the ninth and tenth calls were made simultaneously (two different callers using the same credit card number) then two alarms would be generated at the same time. One alarm for exceeding ten calls per hour and one for exceeding one call per card at a time.

A correlation scheme for step 216 might combine the above two alarms into a single fraud case indicating that a particular credit card has exceeded two different threshold rules. In addition, if a pattern recognition engine is employed, a new threshold rule can be generated to cause an alarm to be generated in the event of any future attempted use of the identified credit card.

Alarms which are generated by the detection layer 123 are sent to the analysis layer 133. Analysis layer 133 analyzes alarm data and correlates different alarms which were generated from the same or related events and consolidates these alarms into fraud cases. This reduces redundant and cumulative data and permits fraud cases to represent related fraud occurring in multiple services. For example, different alarms can be received for possibly fraudulent use of calling cards and cellular phones. The correlation process within analysis layer 133 can determine that fraudulent use of a credit card over a cellular phone is occurring. An alarm database 138 stores alarms received from the detection layer for correlation.

Analysis layer 133 prioritizes the fraud cases according to their probability of fraud so that there are likely to be fewer false positives at the top of the priority list than at the bottom. Thus, fraud cases which are generated due an occasional exceeding of a threshold by an authorized user or by an abnormal calling pattern by an authorized user, such as calling from a new country while on business travel, are typically assigned a low priority. Preferably, analysis layer 133 employs artificial intelligence algorithms for prioritization. Alternatively, detection layer 123 rules can be customized to prevent such alarms in the first place.

In a preferred embodiment, analysis layer 133 includes a software component 134 which performs the consolidation, correlation, and reduction functions. Software component 134 makes use of external data from billing and AR systems 136 in the correlation and reduction processes. Preferably, alarm database 138 resides on the same hardware as software component 134.

In step 218, consolidated fraud cases are sent to expert system layer 139 for automatically executing one or more tasks in response to certain types of fraud cases. Thus, in the example above, automatic action can include notifying the responsible credit card company of the suspected fraud so that they can take fraud-preventive action. In addition, any pending calls can be terminated if such functionality is supported by the network.

Preferably, expert system layer 139 includes a fraud analysis expert system 140, which applies expert rules to determine priorities and appropriate actions. An off-the shelf expert system can be used. Preferably, however, a customized expert system is employed and is programmed using a rules-based language appropriate for expert systems, such as, for example, CLIPS.

Typically, algorithms for step 218 are designed to identify certain cases of suspected fraud which are so egregious that automatic responses are appropriate. However, these algorithms can also be designed to withhold automatic responses where, for example, the suspected fraud is not so flagrant or not too potentially expensive or where certain mitigating circumstances exist, such as, for example, a history of similar activity which were later accounted for or honored by the customer.

Expert system 140 includes interfaces to several external systems for the purpose of performing various actions in response to detected fraud. These can include a system 144 for issuing dunning letters, a system 146 for issuing deactivation notifications and a system 148 for instituting switch-based ANI blocks. Expert system 140 can include an interface to a service provisioning system 142 for retrieving data relating to services provided to a customer and for initiating actions to be taken on a customer's service. Expert system 140 can employ artificial intelligence for controlling execution of automated or semi-automated actions.

Regardless of whether automatic responses are generated, it is important to provide all cases of suspected fraud to live operators so that they can take some action for which the automated system is not capable. Thus, in step 220, all fraud cases, included those which caused automatic responses in step 218 and those which did not are sent to a presentation layer 143 for presentation to human analysts.

Presentation layer 143 preferably includes a plurality of workstations 152a–152n connected to the each other and to expert system 140 via a local area network LAN 150, a wide area network (WAN), or via any other suitably interfacing system. Thus, throughout the remainder of this document, where LAN 150 is referred to, it should be understood that a WAN or any other suitable interfacing system can be substituted. Workstations 152a–152n can be conventional personal computers and can operate as clients having specific software which provides a graphical user interface (GUI) to the system.

Fraud data that has been collected and processed by the detection, analysis and expert system layers can thus be presented to human analysts via workstations 152a–152n via LAN 150. Presentation layer 143 also allows for human analysts operating from workstations 152a–152n to initiate actions to be taken in response to detected fraud. Such actions are executed through interfaces to various external systems. Presentation layer 143 can include a customized, flexible scripting language which forms part of the infrastructure component of the system.

In the example above, if the automated system does not trigger an automatic action, a live operator could, nevertheless, contact the credit card issuer or owner to inform them that the credit card is being used to make two simultaneous credit card calls and that the credit card has been used to make more than ten calls within one hour. If the credit card issuer or owner indicates that the calls are authorized and that the billing will be honored, no further action can be taken. The live operator can even input data into the system so that, in step 214, threshold rules or profiles are altered for this particular credit card so that similar use of the card in the future will not generate alarms.

Alternatively, where the credit card issuer or owner indicates that the calls are not authorized, the live operator can take action to immediately disconnect the calls, if they are still in progress and if the monitored network supports such functionality. Furthermore, the live operator can input data into the system so that, in step 214, alarms are immediately generated if even a single call is attempted to be billed to that credit card. The live operator can also input data into the system so that, in step 218, any alarms generated by that credit card generate an immediate automatic response including terminating the attempted call. Alternatively, the operator can initiate deactivation of the card so that calls based on the card are blocked before any substantial analysis is performed.

Figure 3:
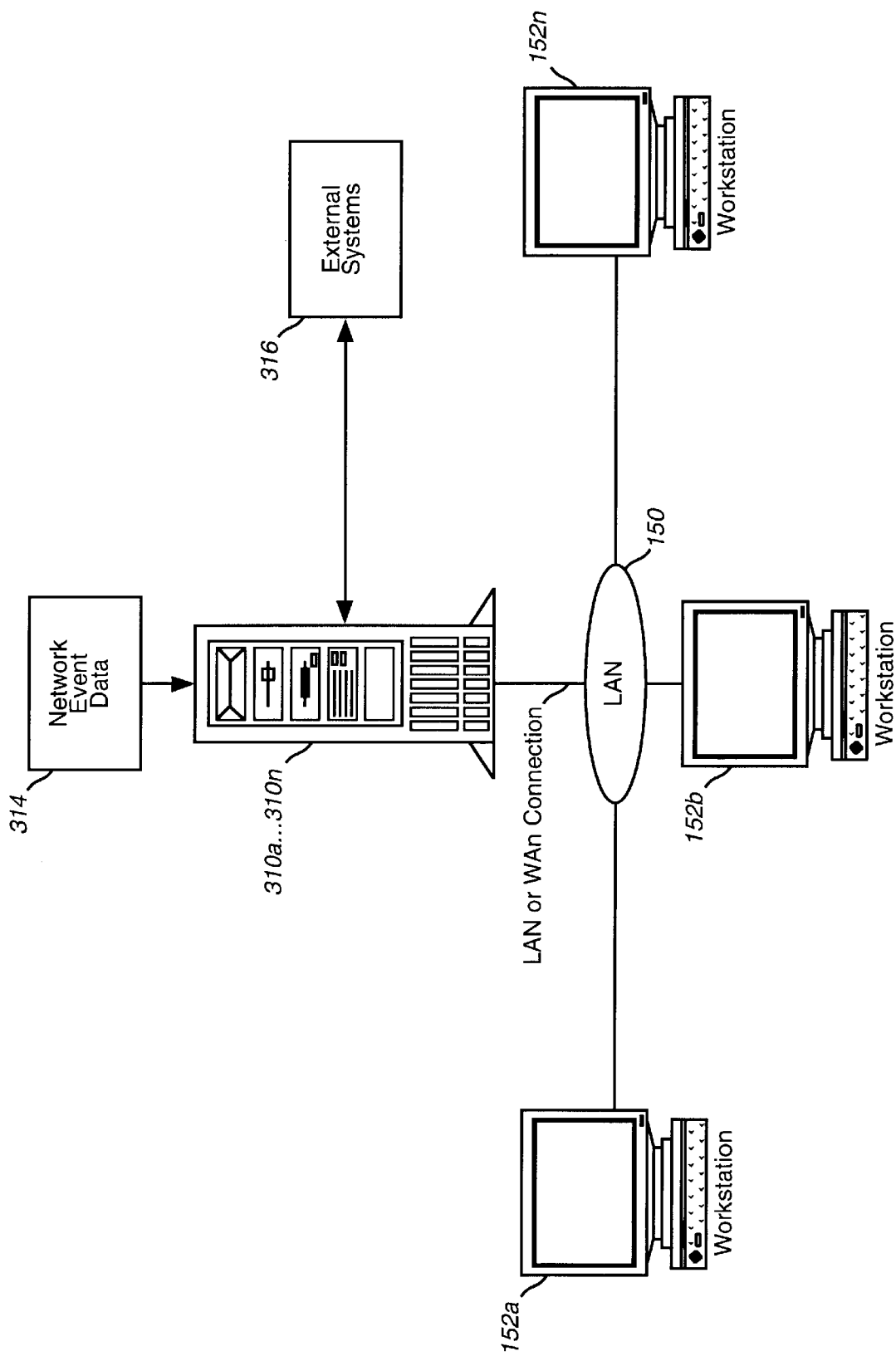
FIG. 3 is a block diagram of a distributed architecture for implementing the present invention.

Referring to FIG. 3, a preferred physical architecture of fraud detection system 169 is a client/server based system which operates on a LAN, WAN or other system, which can be LAN 150. Preferably, the logical components that make up detection layer 123, analysis layer 133 and expert system layer 139 operate on one or more servers such as servers 310a–310n n. These logical components preferably include a rules-based thresholding engine 126, a profiling engine 128, a profile database 130, a pattern recognition engine 132, an alarm consolidation, correlation and reduction unit 134, an alarm database 138 and a fraud analysis expert system 140.

Network event records 314 are provided to servers 310a–310n from data management layer 119 which preferably includes the previously described network information concentrator 120. External systems 316 can provide data for enhancement of internal processes and data in the system. External systems 316 can include a billing and accounts receivable component 136 and various other systems utilized by the detection layer. Fraud analyst workstations 152a–152n provide an interface between fraud detection system 160 and human analysts.

A. Detection Layer

Figure 4:
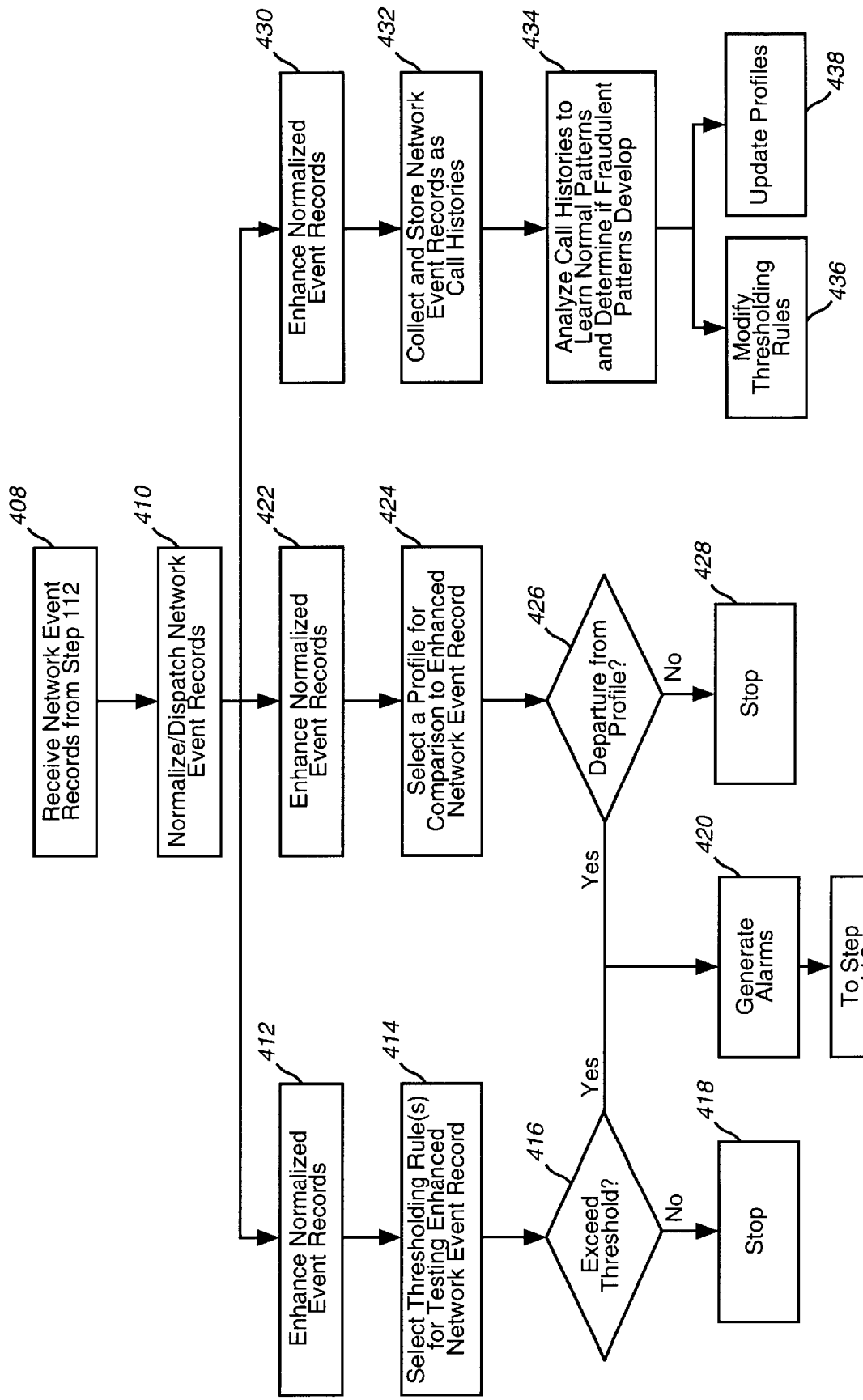
FIG. 4 is a process flowchart expanding upon step 214 of FIG. 2, illustrating a rules-based thresholding process, a profiling process and a pattern recognition process.

Referring to FIG. 4, a process flowchart illustrates various processes that can be performed by detection layer 123. These processes include a rules-based thresholding process (steps 412–420), a profiling process (steps 422–428 and 420) and a pattern recognition process (steps 430–438). Systems for implementing the processes of FIG. 4 are provided in FIGS. 5A, 5D, 6, and 7. In one preferred embodiment, the system is implemented in a distributed processing architecture. For example, the system can be implemented on a plurality of server components 310a–310n.

1. Normalization and Dispatching

Normalization is a process for converting network event records of various formats to standardized formats that are recognized by each of the multiple paths of fraud detection and learning. Preferably, the normalization process is dynamic in that the standardized formats can be varied according to the implementation.

Dispatching is a process for forwarding normalized network event records to particular paths of fraud detection and learning in detection layer 123. Dispatching includes provisioning rules and partitioning rules. Provisioning rules determine which rule set or detection method within detection layer 123 will receive data. Partitioning rules balance loads among multiple processors assigned to a rule set or detection method.

Referring to FIGS. 5A, 5D, 6, and 7, normalizer and dispatcher 124 is provided for normalizing and dispatching network event records 501, sent from data management layer 119. Network event records include those created when a call completes, such as a CDR, EOSR and AMA, and those created during a call and received by the Data Management Layer 119 prior to completion of the call, such as an IAM, BDR, BBN and ADF. Operation of normalizer and dispatcher 124 is described with reference to the flowchart of FIG. 4.

In step 408, network event records 501 are received by normalizer and dispatcher 124. Normalizer and dispatcher 124 preferably includes a core infrastructure 1310 and a user-specific or domain-specific implementation 1312. A normalizer 502 converts network event records 501 from the various formats of the data management layer into standardized formats required by the detection layer.

In step 410, normalizer 502 uses configuration data 504 to convert the network event records 501 into normalized event records 506. Configuration data 504 is user-dependent and thus is part of domain-specific implementation 1312. Normalized network event records 506 are then sent to dispatcher 508 which employs user-specific dispatching rules to pass normalized network event records 506 to appropriate detection-layer engines 126, 128 and 132. In one embodiment, dispatcher 508 provides normalized network event records 506a, which are sent to rules-based thresholding engine 126, normalized network event records 506b, which are sent to profiling engine 128, and normalized network event records 506c, which are sent to pattern recognition engine 132.

Normalizer 502 also stores network event records in an event database 125 for use by one or more engines within detection layer 123. Events are preferably stored for a period of time that can be designated by the user. A storage period can, for example, be set to twenty four hours.

Dispatcher 508 allows the fundamental process being performed by normalizer 502 to be configured for any enterprise by programming data specific to the requirements of the enterprise into the dispatcher 508. Normalizer 502, configuration data 504 and dispatcher 508 also permit quick and easy updates to be made to the normalizer process whenever modifications to downstream detection processes are made.

2. Rules-Based Thresholding

Thresholding is a process whereby network event records are compared to threshold rules. In a telecommunications fraud detection system, where network event records represent telephone calls, network event records are compared to threshold rules to determine whether the network event records represent possible fraudulent use of a telecommunications network.

Figure 5A:
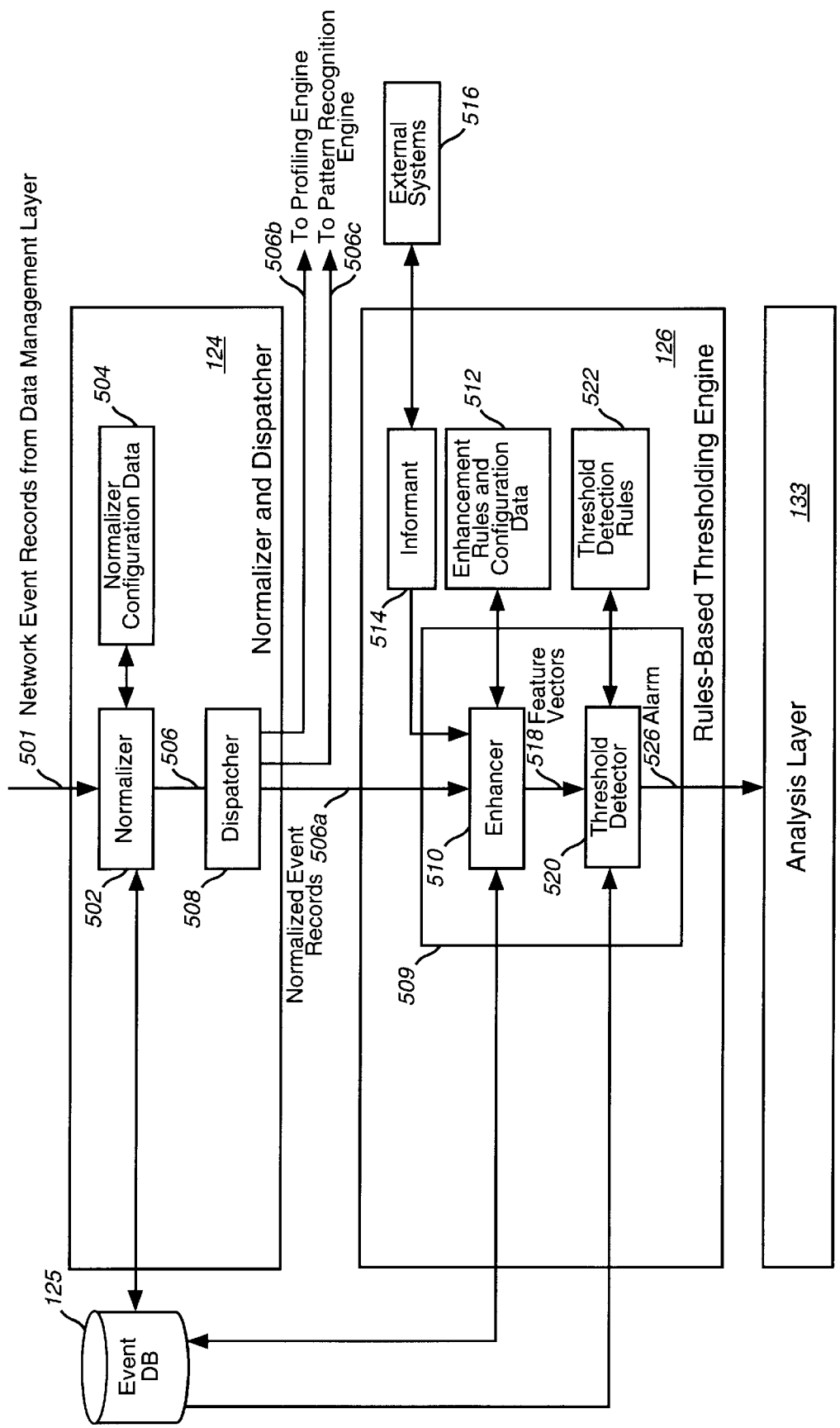
FIG. 5A is a block diagram of a rules-based thresholding engine that can be used in the detection layer of the present invention.

Referring to the process flowchart of FIG. 4, steps 412–420 represent a rules-based thresholding process. In FIG. 5A, details of rules-based thresholding engine 126 are provided for implementing the thresholding process of steps 412–420. In describing the elements and process of thresholding engine 126, the following terms are used:

An event, represented by a normalized event record 506a, generates a feature in thresholding engine 126. Features are defined below. In a telecommunication fraud detection implementation, an event is typically a telephone call.

A generating event is an event that caused a feature to be generated. A generating event is typically the most recent event of a series of events that are measured to calculate a feature value.

A contributing event is an event that contributed to a feature, but did not cause the feature to be generated. While a feature can consist of a single event, it typically consists of one generating event and several contributing events. Every event that is received is at first a generating event, in that when it is received, it generates the calculation of a feature. The event can then become a contributing event for calculation of other features.

A key is an event field, such as ANI, calling card number, call destination, etc. A key is used to identify an event type.

A feature is information that is used by the threshold detector 520 to determine whether evidence of fraud exists. A feature can include, for example, the number of calls made with a certain calling card number in a two hour period. A feature can also be, for example, an NPA of a call. Features are calculated by enhancer 510 in accordance with enhancement rules 512, and with data from one or more events.

There are generally two types of features, single event features and multiple event features. Single event features are derived from a single generating event and include no contributing events. For example, a single event feature can be a call made from a hot ANI. Multiple event features are derived from a generating event and zero or more contributing events. Multiple event features are the result of measurements performed on a key for a period of time such as, for example, a measurement of the number of calls made with certain calling card number within a period of time.

Figure 5B:
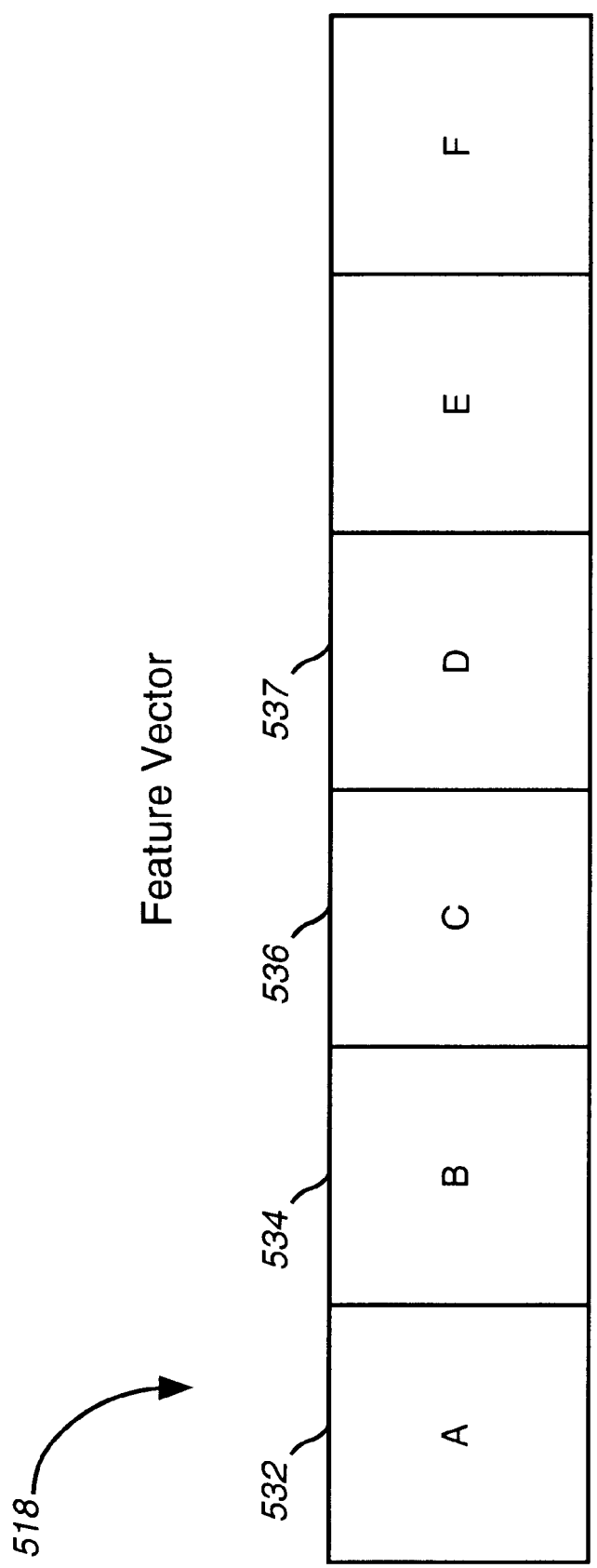
FIG. 5B is a high-level block diagram of a feature vector that can be used to represent features associated with data records.

Referring to FIG. 5B, features can be represented by feature vectors such as, for example, feature vector 518. A feature vector, such as feature vector 518, includes one or more feature vector segments 532, 534, 536, 537, etc., for identifying a collection of features. In a preferred embodiment, enhancer 510 generates feature vectors 518 and passes them to threshold detector 520.

Figure 5C:
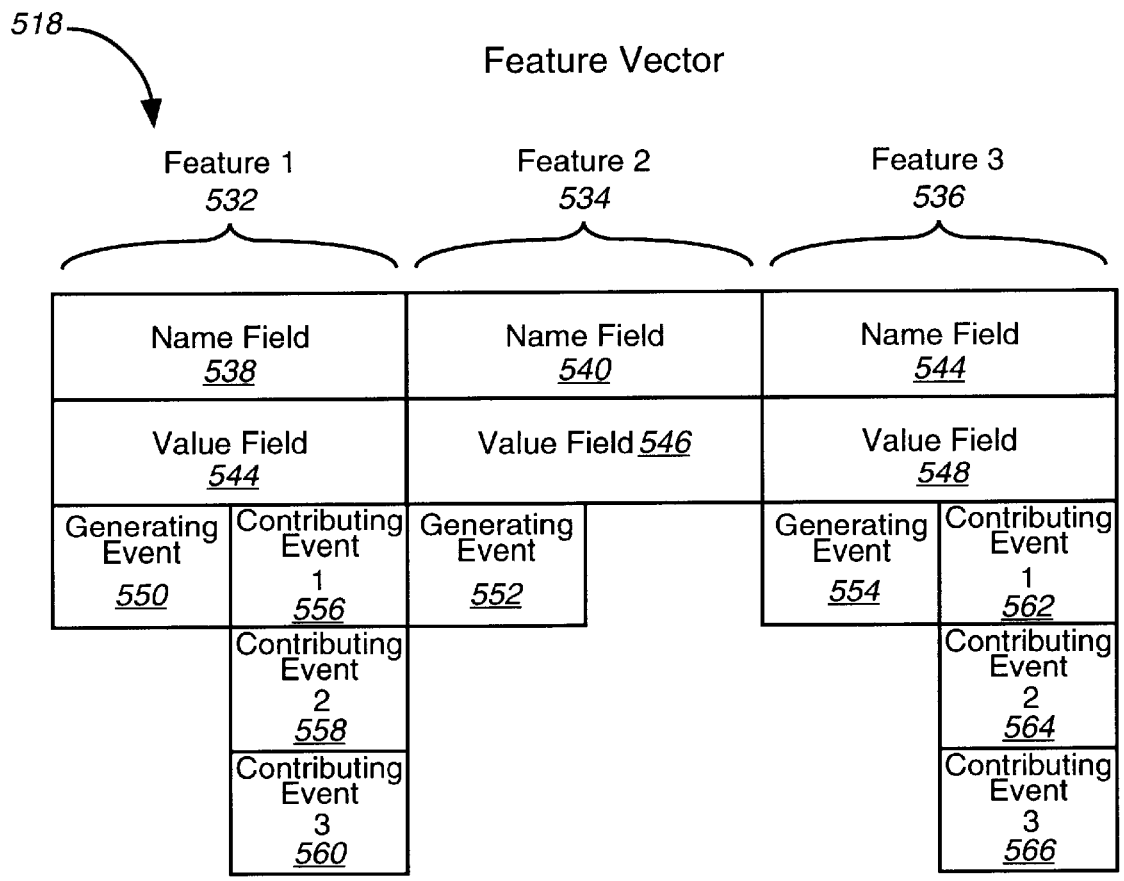
FIG. 5C is a detailed block diagram of the feature vector illustrated in FIG. 5B.

Referring to FIG. 5C, a preferred embodiment of feature vector 518 is provided where each feature vector segment 532–536 preferably includes a feature name field, or key feature field, 538–542, respectively, for identifying a particular key feature. For example, a key feature field might indicate a particular calling card number, an ANI, a credit card account number, a calling number, etc.

Each feature vector segment 532–536 includes a key value field 544–548, respectively, for providing a value for associated feature name fields 538–542. For example, if feature name field 538 identifies a particular calling card number as the key feature represented by feature vector segment 532, feature value field 544 might provide the number of calls made within the past two hours with that calling card. Similarly, if feature name field 540 identifies a particular ANI, feature value field 546 might provide the number of calls made within the past two hours from that ANI.

Generating event fields 550–554 identify a generating event for each feature vector segment 532–544. Recall that a generating event is an event that caused a feature to be generated. A generating event is typically the most recent event which is counted in a value field 544–548. For example, where value field 544 specifies that four calls were made in the past two hours with a particular calling card, the most recent of those four calls is the generating event for feature 532.

Contributing event fields 556–560 and 562–566 represent events which contributed to features vector segments 532 and 536, respectively. Using the example above, where value field 544 specifies four calls within the past two hours and where generating event field 550 represent the fourth one of those calls, contributing event fields 556–560 represent the prior three calls. Note that feature vector segment 534 includes no contributing events. Feature vector segment 534, therefore, represents a single event feature such as, for example, a hot ANI call.

Although generating event fields 550–554 can identify different generating events, feature vector segments 532–536 are, nevertheless related through one or more common aspects of their generating events and/or contributing events.

For example, a feature vector segment 532 can represent calling card calls made within the past two hours with a particular calling card so that generating event 550 and contributing events 556–560 represent calls made within, for example, the past two hours with that calling card. In addition, feature vector segment 534 can represent a hot ANI and generating event 552 can identify a single instance of a call made from the hot ANI. Feature vector segments 532 and 534 are said to be related if one or more of generating event 550 and contributing events 556–560 identify a call that is made with the calling card represented by feature 532, from the hot ANI represented by generating event 552.

Referring back to FIG. 5A, thresholding engine 126 preferably employs a core infrastructure 1310 and a domain-specific implementation 1312. Core infrastructure 1310 includes an enhancer and threshold detection component 509 for applying configurable rules to network event records 506a and for generating alarms 526 in the event that one or more network event records 506a violate one or more configurable rules.

Enhancer and threshold detection component 509 includes at least one enhancer component 510 and at least one or more threshold detector component 520. Enhancer component 510 receives network event records 506a and generates a feature vector for identifying one or more key features associated with event records 506a. Key features can include, for example, ANI, credit card number, calling number, etc. A network event record that triggers generation of a feature vector is referred to as a generating event.

Domain-specific implementation 1310 includes enhancement rules and configuration database 512 and a threshold detection rules database 522. Databases 512 and 522 include rules that can be created, deleted or modified according to evolving needs of a user. Changes to thresholding rules 522 can even be executed while the system is running. When a thresholding rule is created or modified, it will be applied to new events that arrive at the system.

With reference to FIG. 4, in step 412, normalized event records 506a are received by enhancer component 510 within thresholding engine 126. Each event, when it is received, is treated as a generating event, in that it generates the calculation of a feature vector. Threshold enhancer component 510 augments normalized event records 506a to produce feature vectors 518. Enhancement rules specify the fields which are to be kept, omitted, formatted and augmented. Augmentation can provide additional data which enable threshold detector 520, to apply appropriate threshold detection rules. Enhancement rules and configuration data 512 specifies data which is required for enhancement, where to find this data, and how to add it to event records. Thresholding enhancer configuration data 512, analogous to normalizer configuration data 504, provides modularity to the system for both ease of configurability and portability to fraud detection of other enterprises.

Threshold enhancer component 510, based on instructions from enhancement rules and configuration data 512, can request enhancement data from an informant 514. Informant 514 provides a communication interface to one or more external systems 516 from which additional data needed by the enhancer 510 can be retrieved. External systems 516 can include customer order entry systems and network engineering systems.

Based on a request that informant 514 receives from threshold enhancer component 510, informant 514 sends a query to an appropriate external system 516, using a communications protocol of the external system 516. Informant 514 receives the requested data and supplies it to enhancer 510.

Informant 514 thus provides modularity that allows adding and removing various external systems 516 by simply modifying interfaces within informant 514. Thresholding engine 126 can thus be interfaced to a variety of external systems 516 and can be easily reconfigured for fraud detection systems of other enterprises.

When enhancer 510 receives an event record 506a, enhancer 510 determines the type of event based on a key. For example, if the event is a calling card call, a key can be the calling card number field of the event record. Enhancer 510 looks up a rule set, based on provisioning, in enhancement rules and configuration data 512, for that event type.

A rule set includes one or more rules for specifying how to calculate features for an event type. A generating event can trigger the calculation of one or more features. A rule defines a feature and requests that feature be calculated using a certain measurement type. The resulting value of the feature is placed in a feature vector 518.

Multiple measurement types can be performed by enhancer 510, in accordance with specifications in the enhancement rules and configuration data 512. Each measurement type includes an algorithm used to calculate the value of a feature. For example, measurement types can include, but are not limited to, any of the following measurement types:

1) simple count: counts events in a given time period (i.e., number of calls in the past two hours);

2) field count: counts events that meet a criteria for a certain value of an event field (i.e., number of calls with ANI=202-555-1234). Enhancer 510 looks up field in event. If the field value=a specified value, then Enhancer 510 adds the event to a list that will be counted;

3) set count: counts events that meet a criteria for a set of values of a field so that, if a field in an event has a value that is a member of a set (as defined by an enhancement rule), then enhancer 510 counts the event (i.e., number of calls originating in Texas, New Mexico, Arizona, or California);

4) sum: sums a certain field from one or more events in a given time period (i.e., sum the duration of all calls made in past 2 hours);

5) simultaneous: count calls (with certain criteria) that were made at same time, defined by minimum call duration overlap or maximum time separation (i.e., count all calls made with calling card number=nnn, that overlap by at least 2 seconds or that are made within 10 seconds of duration of another call made with same calling card number); and 6) geographic velocity: simultaneous calls over a distance. Rule will provide a minimum time needed between calls, based on physical distance between points of call origination. For example, if a call made with a certain calling card in a first city is placed less than 4 hours after another call made with the same calling card in a second city, and the second city is more than 4 hours in traveling time from the first city, then add both events to list that will be counted.

To count events using any of these measurement types, enhancer 510 places each event in a list, the events being sequenced in time. Each rule specifies a time period in which to include events for a measurement. To perform a count, enhancer 510 begins with the most recent event (the generating event) in the list, and counts events in the list backward in time, until the time period is covered. As a new generating event is received, enhancer 510 begins its count later in the list. This represents a sliding time window.

For example, suppose a rule specifies a field count, such as "count all events in the past two hours in which the ANI equals a certain value." When a first event meeting the ANI criteria is received, it is a generating event, and causes enhancer 510 to retrieve this particular rule from enhancement rules and configuration data 512, using the ANI as a key.

Enhancer 510 places this event in a list of events that meet the same criteria. Enhancer 510 then counts all events in this list going back two hours from the generating event. Other events are contributing events. If another event meeting the same criteria is received, with a time stamp 5 minutes later than the first event, then this second event becomes a generating event. Enhancer 510 counts all events in the list going back two hours from this second event. The first event becomes a contributing event to the second event. The two hour time window slides forward by 5 minutes.

The six measurement types that are described above have the following common functions:

1) they each perform a measurement for a specific key (i.e., calling card number 202-555-1234);
2) they each analyze all events which have the specific key and apply an algorithm to each event within the given time period (the sliding time window);
3) they each return a feature value for the given time period, representing a time window (the time window is set by the most recent event, and goes backward in time from there); and
4) they are all persistent.

Continuing with the process of FIG. 4, enhancer 510 performs a measurement on a generating event, in accordance with a rule that is part of a rule set that is read from enhancement rules and configuration data 512. Each generating event causes enhancer 510 to apply a rule set, a rule set including one or more rules.

The results of a measurement is a feature. Recall that a feature includes a measured feature value, a generating event, and zero or more contributing events. For performance reasons, each event in a feature is represented by an event identifier, which points to an actual event record in event database 125. A single generating event can result in one or more features. Enhancer 510 creates a feature vector, and places each feature in the feature vector.

The following example is provided for a rule which can be, for example:

If calling card number=123456789, then
create feature vector;
calculate simple count: number of calls made in past 2 hours;
calculate set count: number of calls from (list of pay phone ANIS) made in past 2 hours;
calculate simultaneous: number of calls made within 10 seconds of another call, in past 2 hours;

Suppose that enhancer 510 receives an event 506a representing a call made with calling card number=123456789. This is a generating event. Enhancer 510 uses the calling card number as a key, and retrieves the above rule from enhancement rules and configuration data 512.

Enhancer 510 then performs the rule by creating a feature vector 518. Enhancer 510 then reads a list of all events from event DB 125. Beginning with the generating event, enhancer 510 goes back two hours and counts all events representing calls made with that calling card number. This is the simple count. Enhancer 510 goes back two hours and counts all calls made with that calling card number, from a pay phone ANI. This is the set count. Likewise, enhancer 510 performs the simultaneous count. The result of each count, along with identifiers for each event that was counted, is added as a feature to the feature vector 518.

Now enhancer 510 can also include in the feature vector a threshold for a feature. Thresholds are included if called for by an enhancement rule, and are provided by enhancement rules and configuration data 512. They are placed in the feature vector as a feature. For example, feature 534 can represent a threshold for feature 532. A threshold can be a value for measurement (i.e., "5" calls) or a statement of truth (i.e., if ANI=202-555-1234). A statement of truth is equivalent to a default value of 1 (i.e., if 1 call with ANI=202-555-1234).

A feature does not include a threshold for itself. It is simply a measured value. A threshold for a feature can be included in the feature vector as a feature in itself. But it is not necessary for every feature to have a threshold stated as another feature. Enhancer 510 does not perform any comparisons, it simply performs the measurements and creates the feature vector. Comparison of feature values with thresholds, to determine if a threshold has been exceeded, is performed by threshold detector 520. Thresholds can also be obtained from threshold detection rules 522 by the threshold detector 520, as part of the process of determining if a threshold has been exceeded. This is described with reference to step 414, below.

In step 414, threshold rules are applied events to determine whether fraud exists. In the preferred embodiment, feature vectors 518 are received by threshold detector 520 for application of threshold rules.

Threshold detector 520 is responsible for determining if evidence of fraud exists in a feature vector. Threshold detector 520 employs threshold detection rules 522 to perform comparisons of feature values against thresholds. Threshold detection rules 522 specify how comparisons are to be made.

A threshold for a feature can be included as another feature in the feature vector, or can be obtained from the threshold detection rules 522. A threshold is generally a value for a measurement, which can be unity for default. A unity-valued threshold is useful for true/false statements of a feature. For example, if an ANI has been designated as a source of fraudulent calls, any call from that ANI is considered evidence of fraud. A threshold comparison is simply made by identifying a single event that contains that ANI.

Each feature vector segment 532, 534, 536, and 537 is a feature, and each contains a feature value. Threshold detection rules specify to the threshold detector 520 how to perform comparisons to determine if evidence of fraud exists. Threshold detection rules can include, for example, the following types of rules:

1) if A>"5", create evidence (threshold for A is a value obtained from Threshold Detection Rules 522);
2) if A>B, create evidence (threshold for A is another feature in the feature vector);
3) if A>B #and# B>C, create evidence (can be complex statements); and
4) if D, create evidence (threshold is unity; useful for items like a hot ANI or a stolen calling card number).

If an explicit value for a threshold is not given, it is assumed to be unity.

Figure 5D:
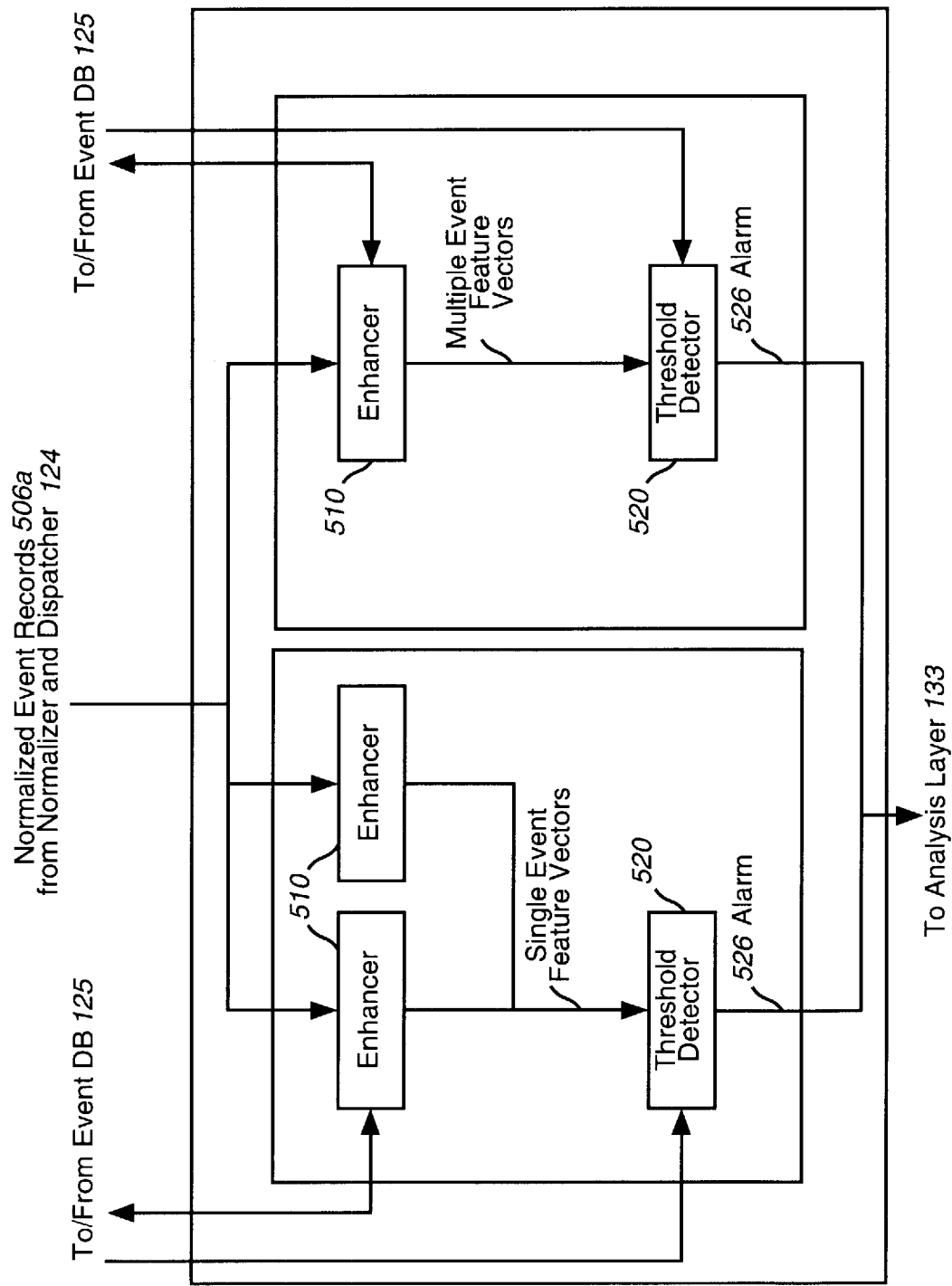
FIG. 5D is a block diagram of an alternative embodiment of the rules-based thresholding engine depicted in FIG. 5A.

Referring to FIG. 5D, in a preferred embodiment, enhancer and threshold detector component 509 includes two sets of enhancer and threshold detector pairs 570 and 572. One pair, which can be pair 570, can be dedicated to analyzing single-event features while the other pair 572 can be dedicated to analyzing multiple event features.

Generally, enhancers 510 generally perform complex calculations, as needed for the various measurement types, while threshold detector 520 generally performs simple comparisons. Thus, for added performance, as illustrated in enhancer and threshold detector pair 570, one or more threshold detectors 520 can be provided with two or more enhancers 510. Such an arrangement provides a more adequate and uniform throughput of data.

Threshold detection rules 522 can be created and modified dynamically, in real-time, while thresholding engine 126 is executing. Preferably, rules can be modified in two ways, corresponding with two general formats of rules.

In a first general format, a rule can be a general statement and can reference specific values in a table. For example, a rule can look like "If number of calls from pay phone ANI>nnn, create evidence", in which nnn is a pointer to a specific value in a table. Rules in this format can be dynamically modified or created by modifying or creating the specific values in the table.

In a second general format, a rule can be hard coded with specific values. For example, a rule can look like "If number of calls from pay phone ANI>10, create evidence". Rules in this format can be dynamically modified or created by modifying or creating the rule itself.

Threshold detection rules 522 can vary according to the enterprise employing the engine. Preferably, threshold rules stored in database 522 can be dynamically modified without taking the engine off-line. Threshold detection rules 522 can be automatically created and modified both automatically by external pattern recognition engine 132 and manually by human analysts. In one embodiment, where rules are automatically generated by pattern recognition engine 132, threshold detection rules database 522 is updated automatically by pattern recognition engine 132.

Alternatively, where rules are automatically generated by pattern recognition engine 132, threshold detection rules database 522 is updated manually by human analysts. In this alternative embodiment, pattern recognition engine 132 is used to detect new patterns of fraud, but instead of automatically creating a threshold detection rule, it notifies a human analyst and suggests a new rule. The human analyst can then enter the suggested rule or create a new rule.

A variety of types of rules can be implemented in threshold detection rules 522. For example, threshold detection rules 522 can include, but are not limited to, rules for generating one or more of the following types of alarms.

A long duration (LD) alarm is generated if a single completed call's duration exceeds a duration threshold, X. LD thresholds can be set by product for call type categories such as targeted international, non-targeted international and domestic. The call type category is determined from the international indicator on the normalized event.

An originating, terminating combination duration (OTCD) alarm is generated if a completed call originating from X and terminating to Y has a duration that exceeds Z. The duration threshold Z for a combination X and Y can be set by product. The origination X and termination Y can be specified as NPA-NXX, NPA or country code. There is no hierarchy required for applying the most specific threshold. Users could, however, implement a hierarchy if desired. One event can generate more than one OTCD alarm.

An originating, terminating combination attempt (OTCA) alarm is generated for a single attempt that originates from X and terminates to Y. OTCA alarms can be set by product. The origination X and termination Y can be specified as NPA-NXX, NPA or country code. There is no hierarchy for applying the most specific origination and termination combination. One event can generate more than one OTCA alarm.

A hot originating attempt (HOA) alarm is generated when a call attempt originates from X. The origination X is contained in a list of pre-defined numbers.

A hot terminating attempt (HTA) alarm is generated when a call attempt terminates to X. The termination X is contained in a list of pre-defined numbers.

A hot originating completion (HOC) alarm is generated when a completed call originates from X. The origination X is contained in a list of pre-defined numbers.

A hot terminating completion (HTC) alarm is generated when a completed call terminates to X. The termination X is contained in a list of pre-defined numbers.

A deactivation hot originating attempt (DHOA) alarm is generated when a call attempt originates from a number from which a recently deactivated card had originated. The measure of how recently the card must have been deactivated is a time parameter T.

A deactivation hot termination attempt (DHTA) alarm is generated when a call attempt terminates to a number to which a recently deactivated card had terminated. The measure of how recently the card must have been deactivated is a time parameter T.

A deactivation hot originating completion (DHOC) alarm is generated when a completed call originates from a number from which a recently deactivated card had originated. The measure of how recently the card must have been deactivated is a time parameter T.

A deactivation hot termination completion (DHTC) alarm is generated when a completed call terminates to a number to which a recently deactivated card had terminated. The measure of how recently the card must have been deactivated is time T.

A pin hacking origination (PHO) alarm is generated when X number of attempts from the same origination fail PIN validation within time T. The number of attempts X is accumulated across all PIN validated products based on infodigit. Call attempts with infodigits indicating pay phones are screened out of the count.

A pin hacking billed number (PHBN) alarm is generated when X number of attempts on the same billed number fail PIN validation within time T. The billed number is calculated by dropping the last four digits from the BTN, i.e., dropping the 4 digit PIN. The number of attempts X is accumulated across all PIN validated products based on infodigit. Call attempts with infodigits indicating pay phones are screened out of the count.

A simultaneous international (SI) alarm is generated when X number of completed international calls using the same authcode/BTN overlap in time by at least 2 minutes within a sliding window of time T. The X number of international calls is specified by product. The sliding window of time T within which simultaneity is checked can not exceed the purge time for normalized events. An international call is determined from the international indicator in the normalized event.

A simultaneous domestic (SD) alarm is generated when X number of completed domestic calls using the same authcode/BTN overlap in time by at least 2 minutes within a duration T of the generating event. The X number of domestic calls is specified by product. The duration T, within which simultaneity is checked, can not exceed the purge time for normalized events. A domestic call is determined from the international indicator in the normalized event.

A simultaneous all (SA) alarm is generated when X number of completed calls using the same authcode/BTN overlap in time by at least two minutes within a duration T of the generating event. The X number of calls is specified by product. The duration T within which simultaneity is checked can not exceed the purge time for normalized events. This alert includes both international and domestic calls.

A geographic velocity check is a check for a pair of calls using the same authcode-plus-PIN/BTN originating from locations between which it would be impossible for a caller to travel during the interval between the calls. Geographic velocity check alarms can be calculated either by specifying time for combinations of originations and terminations or by specifying a latitude/longitude for each country or NPA and a maximum travel speed and performing a time calculation.

A geographic velocity check international (GVCI) alarm is generated when, for X number of pairs of international call completions using the same authcode-plus-PIN/BTN, each pair occurs within a time interval T1, each pair is not simultaneous and each pair occurs within a sliding window of time T2. The X number of pairs of calls is specified by product.

The interval T1 for a pair of calls is determined by the pair's combination of the originating ANI's NPAs and/or country codes. Determining whether the calls are made within a given interval is calculated from the difference between the terminating time of the first call and the originating time of the second call.

The sliding window of time T2 within which the geographic velocity check is performed cannot exceed the purge time for normalized events. An international call is determined from the international indicator in the normalized event.

Similarly, a geographic velocity check domestic (GVCD) alarm is generated when X number of pairs of domestic call completions, using the same authcode-plus-PIN/BTN, would have been impossible for a single caller to make. A geographic velocity check all (GVCA) is generated when X number of pairs of call completions, regardless of domestic or international classification, using the same authcode-plus-PIN/BTN, would have been impossible for a single caller to make.

For certain types of calls, such as toll free or pay to dial calls for example, switch blocks can be configured to block such calls to a set of countries. There are instances, however, where a country block on a switch fails. Thus a failed country block (FCB) alarm can be generated if a call is made from a switch with a block in place to a blocked country. This type of alarm makes use of data indicating, by switch identification, the blocked country codes.

A completed call interval (CCI) alarm is generated when one or more completed calls on an authcode-plus-PIN/BTN exceed one or more thresholds. Thresholds can include cumulative call minutes, completed call counts and cumulative dollars. Thresholds can be based on targeted international, non-targeted international and domestic call type categories. Call type category is determined from an international indicator on the normalized event. CCI alerts can include detection rules comparable to current FMS ceiling and interval alarms.

In step 416, when threshold detector 520 receives a feature vector, it reads through threshold detection rules 522 and applies any rules that are designated for any features included in the feature vector. For example, in FIG. 5C, if a feature vector 518 includes features such as, for example, features 538, 540 and 544, threshold detector 520 will apply any rule that includes comparisons for those features.

If the network event record does not exceed the threshold, no further action is necessary and the process stops at step 418. If, however, the network event record exceeds or violates the threshold rule, evidence, or an indication of possible fraud, is generated.

An indication, or evidence, of fraud preferably includes at least a record containing a priority indicator, account name, and a suspicious event set. Actual contents of evidence are defined by implementation of the infrastructure. Suspicious event sets include a union of all events from the event sets of features that resulted in evidence of fraud. In step 420, if an indication, or evidence, of fraud is generated, threshold detector 520 generates an alarm 526, which is passed to analysis layer 133, preferably with the evidence.

Recall that all events that are received by normalizer 502 are preferably stored in event DB 125 for a period of time that can be designated by the user. A storage period can, for example, be set to twenty four hours. In addition, events that are identified in a suspicious event set can be kept longer for analysis purposes. Suspicious events can be stored in event DB 125 with in indication of suspicion or can be stored in a separate database, so that they are not purged after the typical storage period.

3. Profiling

Profiling is a process whereby normalized dispatched network event records are compared to profiles representing normal and fraudulent use of one or more telecommunications networks. Profiling can require historical network event records to help determine whether a current network event record, fits a profile of fraudulent use of a telecommunications network.

Figure 6:
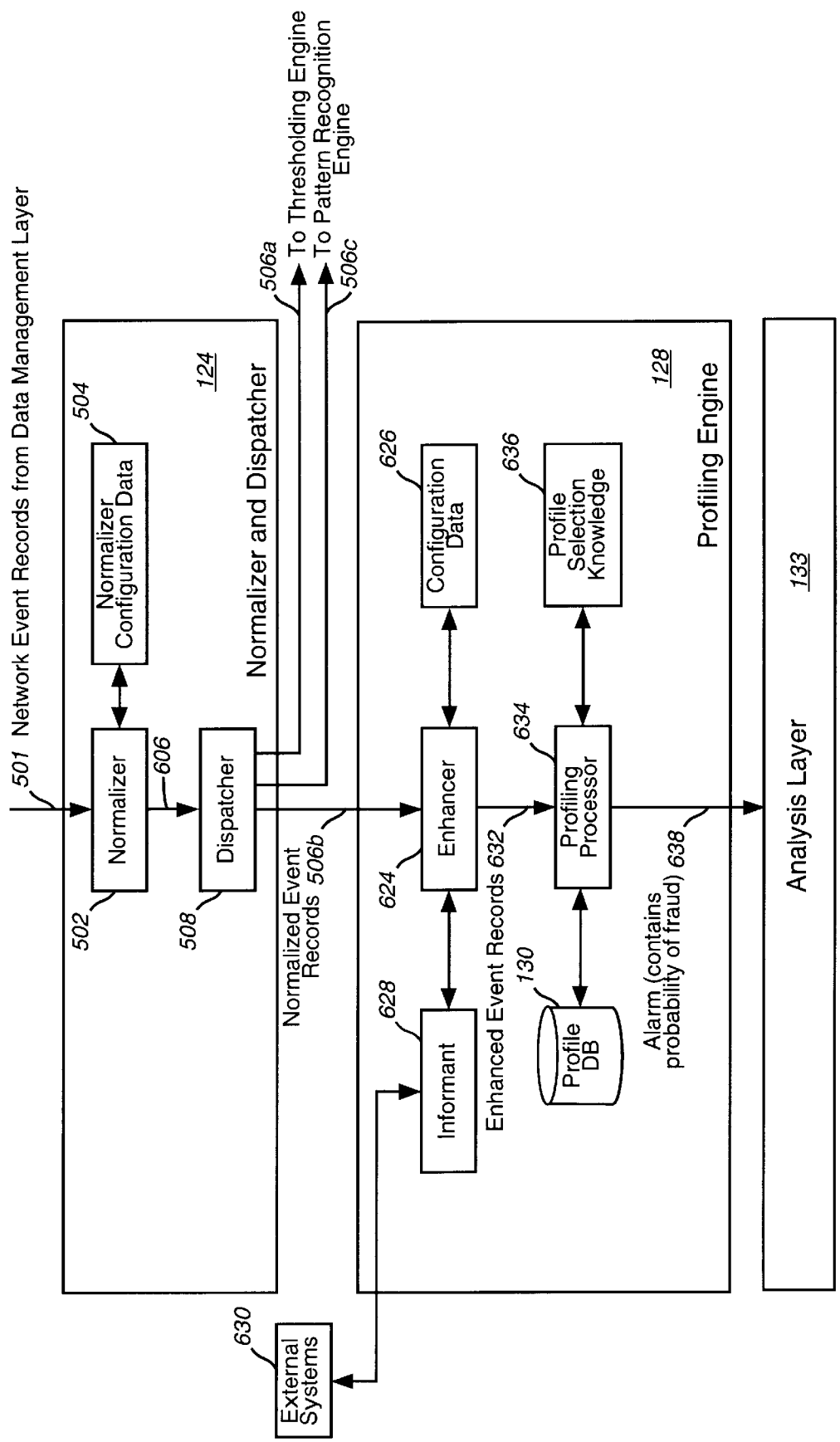
FIG. 6 is a block diagram of a profiling engine that can be used in the detection layer of the present invention.

Referring to FIG. 4, steps 422–428 and 420 represent a preferred process of profiling. In FIG. 6, details of profiling engine 128 are provided for implementing the profiling process of steps 422–428 and 420.

The process begins in step 422, where normalized event records 506b are sent to profiling engine 128 and are received by profiling enhancer 624. Profiling enhancer 624 provides additional data for the profiling processor 634 that will enable the application of appropriate profile detection rules 636. Profiling enhancer 624 operates similar to thresholding enhancer 508 except that profiling enhancer 624 can use a different configuration data component 626 since different types of data can be needed to create an enhanced event record 632 for profiling. Preferably, enhancer component 510 and 625 have similar fundamental structures, yet operate differently through the use of specific configuration data 626 and 512. Configuration data 626 specifies which data is required, where to find it and how to add it to event records. Enhancer 624, based on instructions from configuration data 626, then requests this data from an informant 628.

Informant 628 provides a communication interface to each of several external systems 630 from which additional data needed by the enhancer 624 will be retrieved. Informant 628, similar to threshold informant 514, is used to retrieve required data from external systems 630. Again, the use of modular configuration data 626 and informant 628 components provides the current invention with ease of configurability and portability. Based on a request it receives from the enhancer 624, informant 628 sends a query to the appropriate external system 630 using the communications protocol of the external system 630. Informant 628 receives the requested data and supplies it to enhancer 624.

Enhancer 624 augments normalized event records 606b using data received from informant 628, and thus creates an enhanced event record 632.

In step 424, a profiling processor 634 receives enhanced event records 632 for applying against one or more profiles. Using certain parameters from the enhanced event record 632, the profiling process 634 selects an appropriate profile detection rule 636, several of which are kept in a database. Rules 636 determine which profile from the profile database 130 the event should match up to.

Profiles can be created in any of a number of ways. Profiles can be created as user, product, geographical, or global profiles. Profile database 130 can be an object database, a set of tables, a set of real numbers representing weighting factors for a neural network (as is used in AI technology), or other various forms. Preferably, profiles representing both normal and fraudulent patterns are stored.

In a preferred embodiment, profile development and profile matching employs Artificial Intelligence (AI) technology. Although several AI systems exist for such a purpose, the preferred embodiment utilizes statistical-based algorithms (rather than rules-based) to process volumes of known fraudulent and normal patterns received by pattern recognition engine 132 in order to build fraudulent and normal profiles. Preferably, an AI-based profiling processor 634 also trains itself to formulate profile rules 636 that allows it to match events to profiles and detect departures from normal profiles.

In step 426, profiling component 634 retrieves an appropriate profile from the profile database 130, and compares the event with the profile. If an event falls within the selected profile or profiles, testing stops at step 428. If, however, a departure from the selected profile is detected, profiling component 634 generates an alarm 638 in step 420. Preferably, a probability of fraud is calculated based on the significance and degree of departure and is expressed as a percentage or weighting factor. Preferably, at least step 426 is performed with the aid of Artificial Intelligence (AI) technology. Alarm 638 is then sent to analysis layer 133.

4. Pattern Recognition

Figure 7:
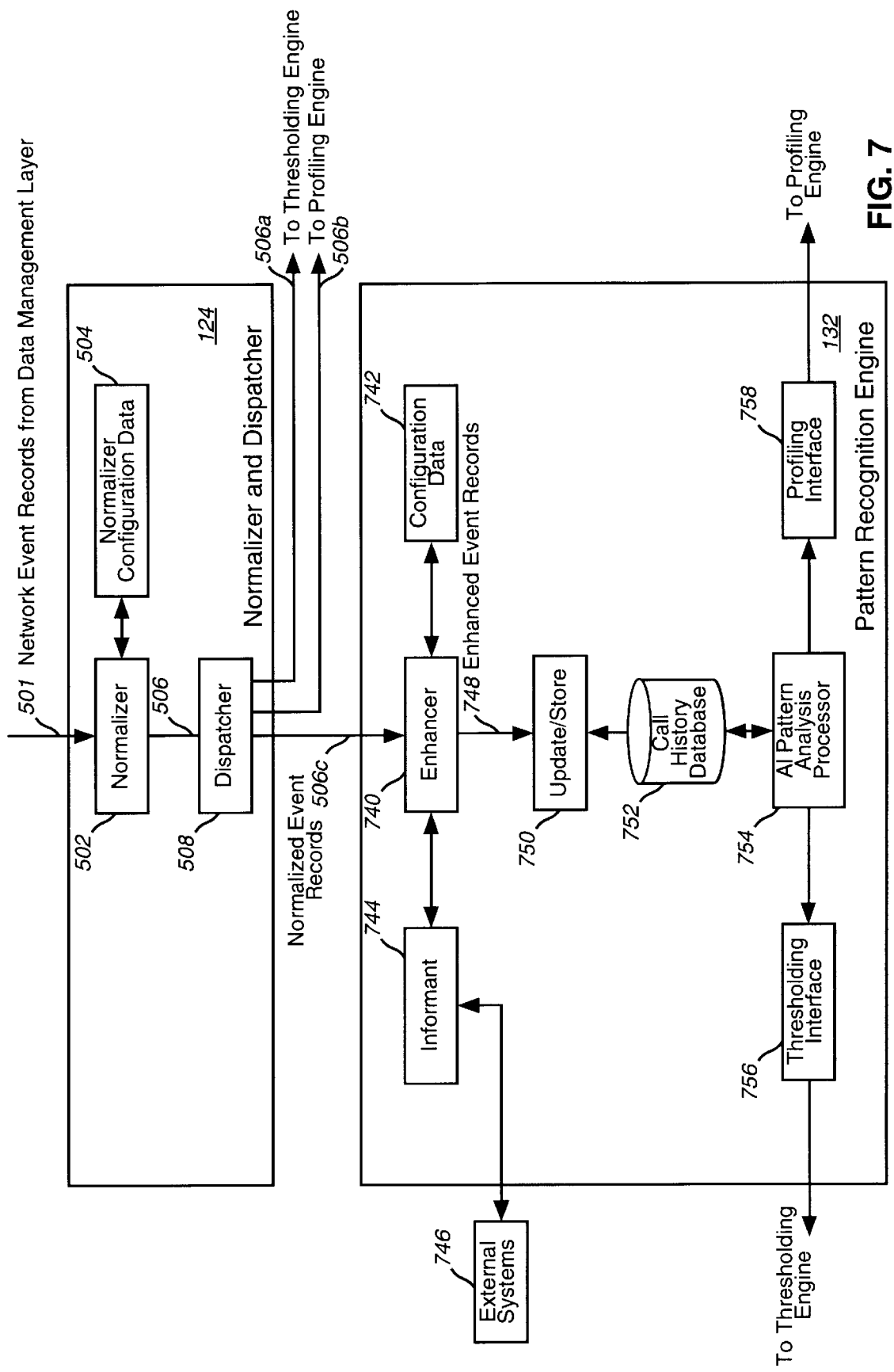
FIG. 7 is a block diagram of an artificial intelligence-based pattern recognition engine that can be used in the present invention.

Pattern recognition is a process whereby network event records are analyzed to learn and to identify normal and potentially fraudulent patterns of use in a telecommunications network. Referring to FIG. 4, steps 430–438 represent a preferred process for pattern recognition and for updating threshold rules and profiles. In FIG. 7, details of pattern recognition engine 132 are provided for implementing the pattern recognition process of FIG. 4. Pattern recognition engine 132 can receive feedback from other layers and can employ components which self-teach fraudulent and non-fraudulent patterns from such feedback.

In step 420, normalized event records 506c are sent to pattern recognition engine 132 where they are received by a pattern recognition enhancer 740. Pattern recognition enhancer 740 operates in much the same manner as the thresholding and profiling enhancers 510 and 624, respectively, except that enhancer 740 employs a different configuration data component 742. Also similar to the thresholding and profiling processes, enhancer 740 uses an informant 744 for data retrieval from external systems 746. This data is used to enhance normalized event records 506c to create enhanced event records 748.

In step 432, enhanced event records 748 are sent to an update and store component 750, which maintains a call history database 752. Update and store component 750 enters each record 748 into the call history database 752. Call history database 752 contains volumes of call data that can be analyzed by a pattern analysis processor 754.

In step 434, pattern analysis processor 754 analyzes call histories from call history database 752 to determine whether any interesting patterns emerge. Interesting patterns include patterns which can be fraudulent and patterns which can be non-fraudulent. Non-fraudulent patterns recognition is important to minimize processing of non-fraudulent information.

If an interesting pattern is detected, pattern analysis processor 754 determines whether it is a fraudulent or non-fraudulent pattern. To accomplish this, pattern analysis processor 754 uses artificial intelligence technology to train itself in identifying fraudulent patterns. By analyzing volumes of events from call history 752, an AI-based pattern analysis processor 754 first determines normal patterns and then looks for deviations that can be identified as fraudulent. Processor 754 then detects emerging patterns of such deviations and identifies them as fraudulent patterns.

There are various AI systems available for such a purpose. Examples include tree-based algorithms that obtain discrete outputs, neural networks, and statistical-based algorithms that use iterative numerical processing to estimate parameters. Such systems are widely used for pattern recognition. By utilizing an AI system for pattern analysis 754, both normal and fraudulent patterns can be identified from the volumes of data stored in the call history database 752.

In step 436, pattern analysis processor 754 uses the results of step 434 to modify threshold detection rules 522 via thresholding interface 756. By recognizing fraudulent patterns, certain thresholding rules can be updated to reflect the most recent patterns of fraud. For example, pattern analysis processor 754 can detect a fraudulent pattern emerging with calling card calls made on weekends to a certain country from certain states in the U.S. It can then update a thresholding rule to generate an alarm 526 whenever such a call is made.

In step 438, pattern analysis processor 754 uses the results of step 434 to modify profiles in profile database 130 via profiling interface 758. Pattern analysis processor 754 feeds known fraudulent and normal patterns to profiling processor 634. Using AI technology, profiling processor 634 processes these patterns to build profiles that are identified as fraudulent or normal. Thus, through use of AI-based pattern recognition, the invention allows for fraud detection to keep pace with the most current schemes of fraud.

The processes of threshold detection, profiling and pattern recognition are described as being performed substantially in parallel primarily to reduce the processing time. The processes can, however, be performed one after another or as some combination of parallel and non-parallel processing.

B. Analysis Layer

Figure 8:
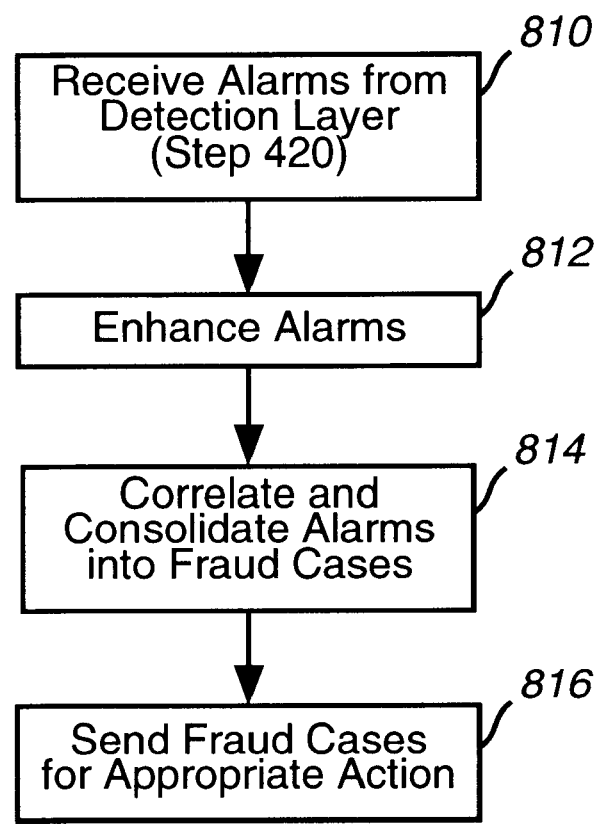
FIG. 8 is a process flowchart illustrating a process for analyzing alarms generated by the rules-based thresholding process and the profiling process of FIG. 4 and for generating cases therefrom.

Referring to FIG. 8, a a process flowchart is provided for a preferred alarm analysis process in which alarms generated in step 420 are analyzed by analysis layer 133 to consolidate and correlate the alarms into fraud cases. Upon case creation or the addition of a new alarm to a case, a case priority is calculated or recalculated. Case priority is calculated from configurable prioritization rules that can make use of any field of the case. Prioritization rules order cases so that there are likely to be fewer false positives at the top of the priority list. Prioritized cases are presented to an expert system and to a human analyst.

Figure 9:
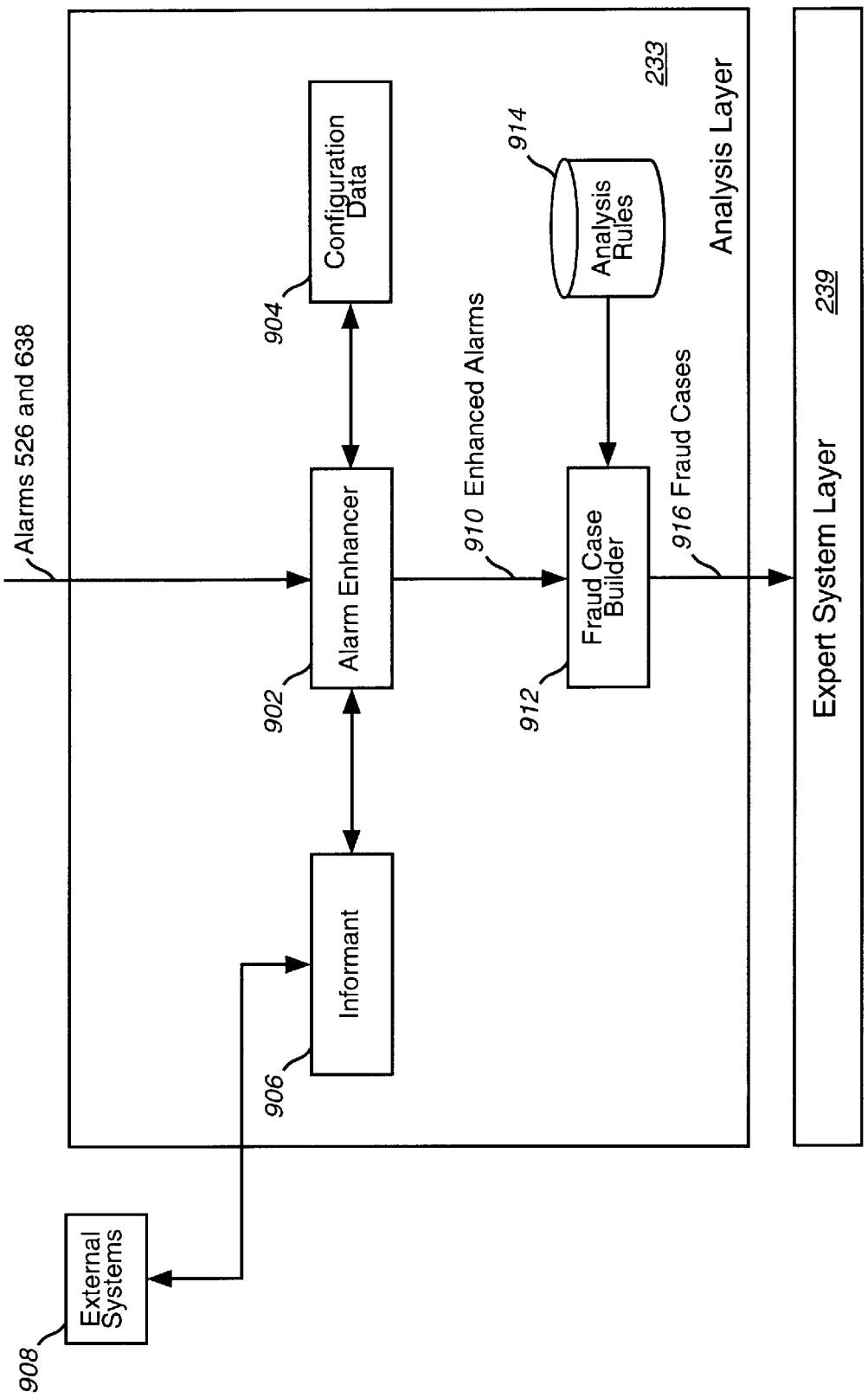
FIG. 9 is a block diagram of the analysis layer of FIG. 1.

Referring to FIG. 9, details of analysis layer 133 are provided for implementing the process of FIG. 8. Analysis layer 133 consolidates alarms by examining various features of each alarm and correlating those that are possibly related to the same fraudulent activity. Analysis layer 133 consolidates correlated alarms to build "cases" of fraud, thus reducing the total number of data that must be further examined. A case of fraud consists of alarms that can span several types of services, but which are possibly related to the same events or callers. Preferably analysis layer 133 includes a core infrastructure portion and a user-specific implementation portion.

Alarms are consolidated into cases according to analysis rules, or case types. Cases include alarms that have some aspect in common. Alarms can be consolidated into one or more cases depending on the analysis rules used. Each alarm must belong to at least one case. If an alarm is created that matches an existing non-closed case, the alarm will be added to the case. Otherwise, a new case is created for the alarm.

In step 810, alarms 526 from thresholding engine 126 and alarms 638 from profiling engine 128 are received by an alarm enhancer 902. Alarms 526 and 638 represent instances of possible fraud and designate fraud service type such as cellular, calling card, etc. Alarms 638 from profiling engine 128 are preferably accompanied by probability of fraud.

In step 812, these alarms are enhanced. Alarm enhancer 902 is similar to the detection layer enhancers 510, 624 and 740. Enhancer 902 augments alarms 526 and 638 to produce enhanced alarms 910. Configuration data 904 specifies additional information which can be needed and how that information should be added, based on the type of alarm received. Additional information can be retrieved from billing, accounts receivable, order entry, or various other external systems 908. For example, informant 906 can access an accounts receivable system to determine that "this ANI has a past due account of $1000". Similarly, informant 906 can access an order entry system to determine that "this calling card number was deactivated two months ago". Informant 906 communicates with various external systems 908 to retrieve the requested information. Alarm enhancer 902 then adds this information to alarms 526 and 638 and produces enhanced alarms 910.

In step 814, enhanced alarms 910 are sent to a fraud case builder 912 for correlating and consolidating various alarms into related fraud cases. This correlation is based on common aspects of alarms. An example of such a common aspect is "alerts having the same calling card number".

Correlation is governed by analysis rules 914, which can be programmed and kept in a rules database. Rules 914 can use the probability of fraud which was assigned by profiling processor 634 as a parameter. For example, a rule can state "only build cases from alarms having greater than 50% probability of fraud and which are generated for the same account".

In operation, fraud case builder 912 receives an enhanced alarm 910 and determines whether there is an existing case or cases in which to place the alarm. Fraud case builder 912 looks for features which the alarm can have in common with existing cases, using analysis rules 914. If no existing case is appropriate, fraud case builder 912 creates a new case for the alert.

Fraud case builder 912 attempts to prevent duplication of cases. Fraud case builder 912 also attempts to prevent corruption of cases, which otherwise might occur due to the distributed platform of the invention. For example, in this parallel processing environment, multiple instances of the same process, such as updating a case, can occur. If two analysts are attempting to update the same case with either identical data or different data, case builder 912 attempts to ensure that the case reflects both data if the data are different, and attempts to ensure that duplicate cases are not created if both data are identical. Fraud case builder 912 can employ a case-locking mechanism to accomplish this goal.

A primary objective of the analysis layer is to reduce the amount of data that an analyst must examine. Thus, although an alarm can go into more than one fraud case, overall reduction of data can still be achieved. For example, an alarm for a calling card call can designate both the card number and the ANI. The alert can then be placed in a first case of consolidated alarms based on a common card number, and in a second case of consolidated alarms based on a common ANI. However, overall reduction of alerts will generally be achieved as the number of alarms that are consolidated exceeds the number of alerts that are placed in more than one case.

In step 816, fraud case builder 912 outputs fraud cases 916 to expert system layer 139 for further analysis and action.

C. Expert System Layer

Figure 10:
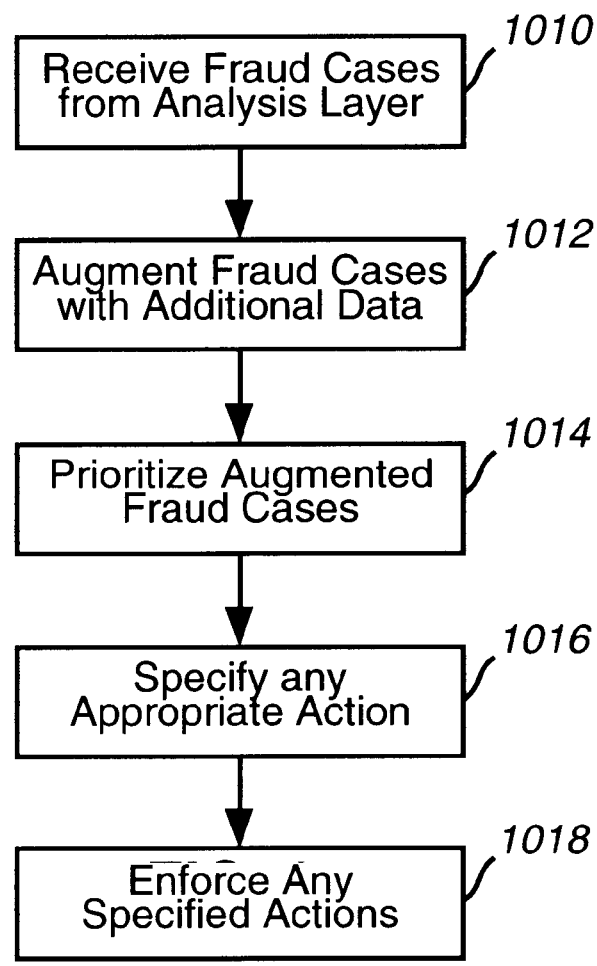
FIG. 10 is a process flowchart illustrating a method for prioritizing fraud cases and for taking appropriate action upon certain of those prioritized fraud cases.
Figure 11:
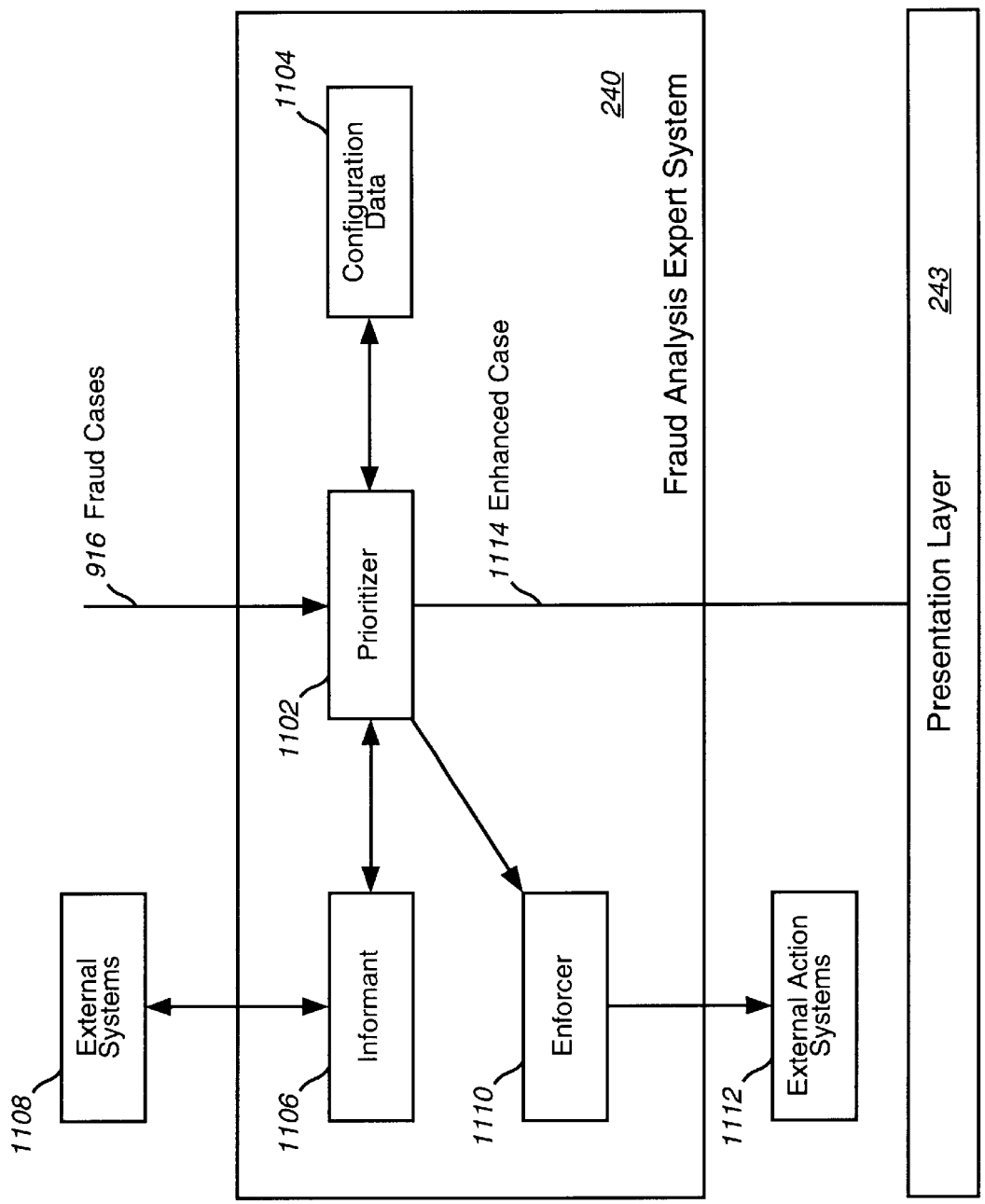
FIG. 11 is a block diagram of the expert system layer of FIG. 1.

Referring to FIG. 10, a process flowchart is provided for analyzing fraud cases and for automatically acting upon certain cases. The process analyzes cases by prioritizing them, adding additional information relevant to each case and performing automated actions for some cases. Since some actions are performed automatically, the action rules which trigger automatic actions are applied only to cases where a very high probability of fraud exists or where the potential cost of fraud is significant. In FIG. 11, details of expert system layer 139 are provided for implementing the process of FIG. 10.

In step 1010, fraud cases 916 are sent from analysis layer 133 and received by a prioritizer 1 102. Prioritizer 1 102 enhances fraud cases 916, assigns priority to them and determines whether any actions should be automatically executed.

In step 1012, fraud cases 916 are enhanced. To enhance cases, prioritizer 1102 uses configuration data 1104, an informant 1106, and external systems 1108. Configuration data 1104 specifies any additional information which can be needed for fraud cases 916, where to find the data and how to add the data to a fraud case. Informant 1106, serves as a communication interface to external systems 1108. Informant 1106 sends a query to an appropriate external system 1108 using a communications protocol of the external system 1108. Informant 1106 receives the requested data and supplies it to prioritizer 1102. Prioritizer 1102 then adds the information to a fraud case, creating an enhanced fraud case 1114.

In step 1014, enhanced fraud cases are prioritized. To assign priority to cases, prioritizer 1102 employs prioritization rules which are kept as part of configuration data 1104. Prioritization rules are based on experienced analysts' rules for determining and prioritizing fraud cases. These rules are programmed into configuration data 404 as logical algorithms. Prioritization rules can also employ parameters retrieved from external systems such as, "how much has customer's past revenue been." Such parameters are useful for determining the potential cost of a fraud case, which is influential in determining priority.

In step 1016, prioritized fraud cases are analyzed and appropriate actions are specified based on action rules. In determining whether to initiate action on a case, prioritizer 1102 uses action rules which are kept as part of configuration data 1104. An action is a response to suspected fraud and involves an external system. Examples of actions include card deactivation or activation or use-range privilege modifications. Actions are categorized as automatic, semi-automatic, user initiated, mail initiated or manual. Automatic and semi-automatic actions are initiated by an expert system, following pre-defined rules. Other actions are typically initiated by human analysts.

Semi-automatic actions are initiated by an expert system under pre-specified conditions. For example, under a pre-specified condition of excessive back-logs, the expert system can automatically deactivate high-priority fraud cases.

User initiated actions are performed upon user requests. Actions can include activations and deactivations of accounts such as telephone accounts, credit card account and debit card accounts.

Electronic mail initiated action are performed upon a request received from external groups, such as a customer service group, through electronic mail scripts. Actions can include activations and deactivations of accounts such as telephone accounts, credit card account and debit card accounts.

Manual actions are initiated by users external to the system and executed independent of the system. The external user can request that the system record that the action was performed.

Action rules are based on experienced analysts' rules for specifying actions to take on a fraud case. Actions can include deactivating a calling card number, placing a switch block on an ANI or sending out a notice to a customer. Action rules can be programmed as logical algorithms and can consider such parameters as priority (i.e., "for any case over priority level N, deactivate account") and type of service (i.e., cellular. calling card, dial 1). Action rules can include data retrieved from external systems.

Action rules form part of the implementation layer. Action rules for manual actions can reference special handling instructions for acting upon suspected fraud on certain customer accounts. For example, special instructions might indicate to contact a customer fraud investigation unit rather than contacting card holder whose card is suspected of fraudulent activity.

Action rules are programmed into configuration data 404 as logical algorithms to be applied to enhanced cases. These actions can be based on priority (i.e., "for any case over priority level N, deactivate account"), type of service (i.e., cellular, calling card, dial 1), or enhanced data retrieved from external systems 1108.

In step 1018, an enforcer 1110 executes actions specified in a step 1016 interfacing with various external action systems 1112. External action systems can include switch interface systems for switch-based ANI blocks, order entry systems for account deactivations, network control systems for calling card deactivations, electronic mail system for e-mail notices to customers or internal personnel, customer service centers, print centers for mailing dunning letters and various other systems. Enforcer 1110 preferably resides on servers 310a . . . 310n.

In operation, enforcer 1110 receives a request for action from prioritizer 1102 and interfaces with an appropriate external action system 1112 to execute the action. External action systems 1112 can include switch interface systems for switch-based ANI blocks, order entry systems for account deactivations, network control systems for calling card deactivations, electronic mail system for e-mail notices to customers or internal personnel, customer service centers, print centers for mailing dunning letters, or various other systems.

Since these actions are performed automatically, the action rules that trigger them are preferably applied only to cases where a high probability of fraud exists or where the potential cost of the fraud is significant. Prioritizer 1102, along with the prioritization rules and action rules that are kept as configuration data 1104, perform as an expert system, applying expert rules to data records to determine what actions to perform. An off-the-shelf expert system can be used. However, it is preferable to program a customized expert system using a logic-based language appropriate for expert systems, such as CLIPS.

Cases in which an automated action is not warranted are sent to presentation layer 143 for further examination and potential action from a human analyst. Also sent as part of an enhanced case 414 to presentation layer 143 are data not useful to the automated expert system layer 139, such as text notes added to a case by a human analyst working at workstation 152a–152n.

D. Presentation Layer

Fraud cases 1114, including those which warrant automatic action in the expert system layer 139 and those which do not, are sent to presentation layer 143 for examination and potential action by a human analyst at workstations 152a–152n.

Figure 12:
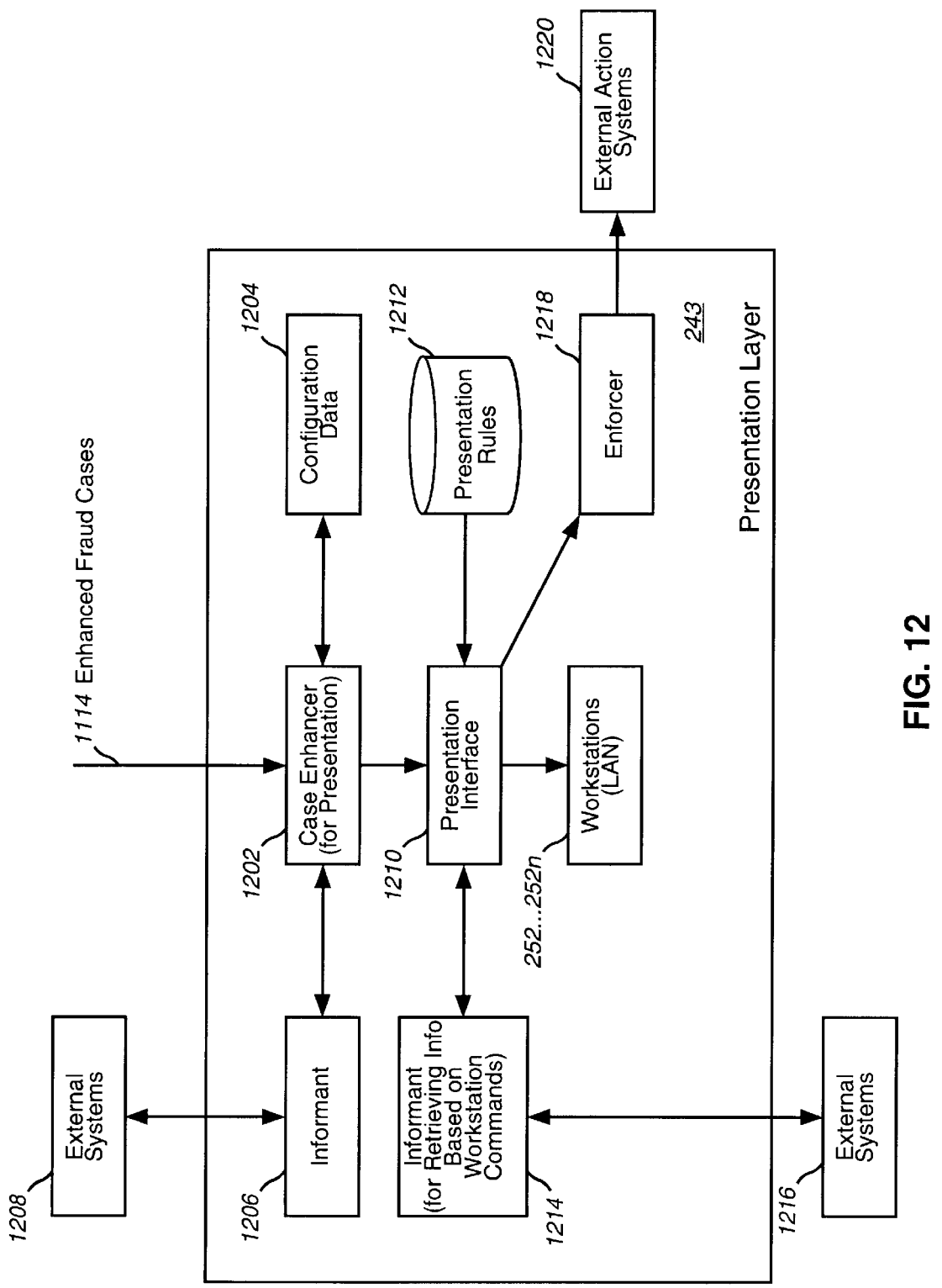
FIG. 12 is a block diagram of the presentation layer of FIG. 1.

Referring to FIG. 12, details of a presentation layer 143 are provided for interfacing the detection layer 123 and analysis layer 123 with human analysts working at workstations 152a . . . 152n which are connected to LAN 150. Preferably, fraud cases 1114 include data generated in upper layers such as probability of fraud, information retrieved from external systems, and any actions already taken. Presentation layer 143 preferably allows human analysts to retrieve and add additional data and to perform actions similar to those performed by the expert system layer 139.

Enhanced fraud cases 1114 from expert system layer 139 are received by case enhancer 1202. Similar to data enhancers of the upper layers, case enhancer 1202 uses configuration data 1204, an informant 1206, and external systems 1208 to augment enhanced fraud cases 1114 with additional information relevant for presentation to an analyst.

A presentation interface 1210 serves as an interface to workstations 152a . . . 152n, providing data for graphical presentation to the analyst. Fraud cases are presented according to presentation rules 1212, which are programmed as logical algorithms into a database and are configurable. Presentation interface 1210 employs an informant 1214 and external systems 1216 to retrieve additional information. However, this is not automatic, as in the upper layers. Rather informant 1214 retrieves data from external systems 1216 based on commands from analysts at work stations 152a . . . 152n. For example, an analyst can view a case and decide that a customer's payment history is needed prior to taking any action. The analyst, via a workstation 152a . . . 152n, sends a command to presentation interface 1210 requesting this data. Presentation interface 1210 then instructs informant 1214 to retrieve this data from an external accounts receivable system 1216.

Presentation interface 1210 uses enforcer 1218 for performing actions. This is not automatic, as it was in the expert system layer 139. Rather, enforcer 1218 performs actions based on commands from analysts. For example, an analyst can decide that a switch block on an ANI is needed. The analyst, via a workstation 152a . . . 152n, sends a command to presentation interface 1210 requesting a switch-based ANI block. Presentation interface 1210 then instructs enforcer 1218 to execute the command. Enforcer 1218 interfaces with an external action, switch interface system 1220 to implement the ANI switch block. Other external action systems 1220 can be similar to those employed by expert system layer 239.

IV. Conclusions

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for detecting fraud and automatically generating alarms based on real-time event data in a telecommunications system by using artificial intelligence, comprising the steps of:

(1) combining core infrastructure with configurable user-specific implementation rules and automatically acting upon evolving fraud patterns;

(2) performing a plurality of types of fraud detection tests on network event records by normalizing the network event records from a variety of formats into standardized formats;

(3) dispatching normalized network event records to at least one fraud detecting engine from among a plurality of fraud detecting engines;

(4) parallel processing the dispatched portions in the plurality of fraud detecting engines by enhancing the normalized dispatched network event records prior to testing for fraud;

(5) generating fraud alarms upon detection of suspected fraud by any of the fraud detection tests;

(6) correlating the fraud alarms into fraud cases based on common aspects of the fraud alarms; and (7) automatically responding to certain of the fraud cases.

2. The method of claim 1, wherein step (2) comprises the steps of:

(a) selecting a threshold rule from a plurality of threshold rules stored in a threshold rule database; and (b) determining whether a network event record violates the selected threshold rule.

3. The method of claim 2, further comprising the step of:

(c) updating the threshold rule database during run-time.

4. The method of claim 3, wherein step (c) comprises the steps of:

(i) analyzing the network event records to identify new methods of fraud;

(ii) generating new threshold rules for detecting the new methods of fraud; and (iii) updating the threshold rule database with the new threshold rules.

5. The method of claim 3, wherein step (c) comprises the steps of:

(i) analyzing the network event records to identify new methods of fraud using artificial intelligence;

(ii) generating new threshold rules for detecting the new methods of fraud using artificial intelligence; and (iii) updating the threshold rule database with the new threshold rules.

6. The method of claim 1, wherein step (2) comprises the steps of:

(a) selecting a profile from a plurality of profiles stored in a profile database; and (b) determining whether a network event record violates the profile;

wherein step (4) comprises the step of generating an alarm and a probability of fraud based upon the extent of the departure if a network event record violates the profile.

7. The method of claim 6, further comprising the step of:

(d) updating the profile database during runtime.

8. The method of claim 7, wherein step (d) comprises the steps of:

(i) analyzing the network event records to identify new methods of fraud;

(ii) generating new profiles representative of the new methods of fraud; and (iii) updating the profile database with the new profiles.

9. The method of claim 8, wherein steps (ii) and (iii) are performed via artificial intelligence.

10. The method of claim 1, wherein step (5) comprises the step of:

(a) prioritizing the fraud cases to indicate a probability of fraud associated with each of the fraud cases.

11. The method of claim 10, wherein step (a) comprises the step of enhancing the fraud alarms with data prior to correlating.

12. The method of claim 10, wherein step (a) comprises the steps of:

(i) retrieving data from an external system; and (ii) enhancing the fraud alarms with the retrieved data prior to correlating.

13. The method of claim 1, further comprising the steps of:

(8) presenting the fraud cases to live operators; and (9) manually responding to certain of the fraud cases.

14. A multi-layer fraud detection system using artificial intelligence for a telecommunications system, the telecommunications system comprising a network layer having at least one telecommunications network, a service control layer for managing the network layer and for generating service records containing data representing instances of telecommunications in the network layer, and a data management layer for receiving the service records from various components and processes of the service control layer and for reducing data by eliminating redundancy and consolidating multiple records into network event records, the multi-layer fraud detection system comprising:

a detection layer comprising a core infrastructure and a configurable, domain specific implementation to receive network event records from the data management layer, to test the network event records for possible fraud and to generate alarms indicating incidences of suspected fraud;

an analysis layer to receive alarms generated by the detection layer and to consolidate the alarms into fraud cases; and an expert system layer comprising a core infrastructure and a configurable, domain specific implementation to receive fraud cases from the analysis layer and to act upon certain of the fraud cases.

15. The multi-layer fraud detection system of claim 14, wherein said detection layer further comprises at least one fraud detection engine having a core infrastructure and a configurable, domain specific implementation.

16. The multi-layer fraud detection system of claim 15, wherein said detection layer further comprises:

a network event normalizer to convert network event records from any of a plurality of formats into standardized formats for processing by said at least one fraud detection engine; and a dispatcher to dispatch portions of said normalized network event records to said at least one fraud detection engine.

17. The multi-layer fraud detection system of claim 15, wherein said at least one fraud detection engine comprises a rules-based thresholding engine.

18. The multi-layer fraud detection system of claim 15, wherein said at least one fraud detection engine comprises:
   a configurable enhancer that augments event records with additional data; and
   a configurable informant to interface said enhancer to an external system and to retrieve additional data from the external system.

19. The multi-layer fraud detection system of claim 18, further comprising:
   means for interfacing said informant with the external system in a format native to the external system; and
   a rules database comprising instructions for processing the enhanced event records to detect fraud.

20. The multi-layer fraud detection system of claim 19, wherein:
   said at least one fraud detection engine includes a rules-based thresholding engine; and
   said rules database comprises threshold rules for use by said rules-based thresholding engine.

21. The multi-layer fraud detection system of claim 19, wherein:
   said at least one fraud detection engine includes a profiling engine; and
   said rules database comprises profiles for use by said profiling engine.

22. The multi-layer fraud detection system of claim 15, wherein said detection layer further comprises a pattern recognition engine that learns new patterns of fraud and that generates updates for said at least one fraud detection engine.

23. The multi-layer fraud detection system of claim 14, wherein said analysis layer comprises a core infrastructure and a configurable, domain-specific implementation.

24. The multi-layer fraud detection system of claim 23 wherein said analysis layer further comprises:
   a configurable alarm enhancer to augment fraud alarms with data;
   a configurable informant to interface said alarm enhancer to an external system and to retrieve additional data from the external system; and
   a configurable fraud case builder to consolidate fraud alarms that are generated by said detection layer.

25. The multi-layer fraud detection system of claim 24, wherein said user-specific implementation layer of said analysis layer further comprises:
   means for interfacing said informant with the external system in a format native to the external system; and
   an analysis rules database comprising instructions for said fraud case builder for filtering and correlating fraud alarms into fraud cases according to at least one common attribute.

26. The multi-layer fraud detection system of claim 25, wherein said at least one common attribute is one of the following attributes:
   ANI;
   originating switch;
   credit card number;
   DNIS;
   destination country;
   originating geographic area;
   originating area code; and
   calling equipment type.

27. The multi-layer fraud detection system of claim 14, wherein said expert system layer domain-specific implementation comprises:
   a configurable prioritizer that generates enhanced fraud cases, prioritizes the enhanced fraud cases and directs actions on external action systems for certain of the prioritized, enhanced fraud cases;
   a configurable informant that interfaces said alarm enhancer to an external system and that retrieves the additional data from the external system; and
   a configurable enforcer that interfaces said prioritizer to an external action system and that directs execution of actions by the external action system based upon commands that are generated by the prioritizer.

28. The multi-layer fraud detection system of claim 27, wherein said user-specific implementation layer of said expert system layer includes a configuration database, and wherein said configuration database comprises:
   means for interfacing said informant with the external system in a format native to the external system; and
   prioritizing rules for use by the prioritizer.

29. The multi-layer fraud detection system of claim 14, further comprising:
   a presentation layer that receives prioritized fraud cases from said expert system layer and that presents the prioritized fraud cases to live operators, wherein said presentation layer includes a core infrastructure and a configurable, domain-specific implementation.

30. The multi-layer fraud detection system of claim 29, wherein said domain-specific implementation of said presentation layer comprises:
   a configurable case enhancer that enhances prioritized fraud cases with additional data;
   a configurable presentation interface that distributes the enhanced, prioritized fraud cases to one or more workstations and that sends action commands generated at the workstations to an external action system;
   a configurable first informant that interfaces said case enhancer to a first external system and that retrieves data from the first external system;
   a configurable second informant that interfaces said presentation interface to a second external system and that retrieves data from the second external system, based upon commands generated at the workstations; and
   a configurable enforcer that interfaces the workstations, via said presentation interface, to the external action system and that directs execution of actions by the external action system based upon commands generated at the workstations.

31. The multi-layer fraud detection system of claim 30, wherein the first and second external systems are each a part of the same external system.

32. The multi-layer fraud detection system of claim 30, wherein said user-specific implementation layer of said presentation layer further comprises:
   means for interfacing said informant with the first external system in an interfacing format that is native to the first external system; and
   configurable presentation rules to direct presentation of enhanced, prioritized fraud cases at the workstations.

33. A method for detecting fraud and automatically generating alarms based on real-time event data in a telecommunications system by using artificial intelligence, comprising the steps of:
   (1) analyzing a history of network event records to identify normal and fraudulent patterns;
   (2) determining whether a network event record violates a selected threshold rule by comparing said network event record with a selected profile, wherein said threshold rule and said selected profile include a scalable core infrastructure and a user-configurable, domain-specific implementation within a layered logical systems architecture;

(3) determining whether the network event record deviates from a selected profile;

(4) generating an alarm when the network event record violates the selected threshold rule; and (5) generating an alarm when the network event record deviates from the selected profile.

34. The method of claim 33, further comprising the steps of:

(5) performing steps (2) and (3) in parallel.

35. The method of claim 33, further comprising the step of:

generating at least one of the following types of updates when a fraudulent pattern of use is identified:
updates for a threshold rules database; and
updates for a profile database.

36. A system for processing event records by using artificial intelligence for detecting fraud and automatically generating alarms based on real time event data in a telecommunications system, comprising:

a scalable core infrastructure that can be implemented in more than one application; and a configurable, domain-specific implementation including configurable rules.

37. The system according to claim 36, wherein said core infrastructure is implemented as part of a telecommunications fraud detection system and said configurable, domain-specific implementation comprises:

thresholding rules for testing telecommunications network event records; and profiles for comparison to telecommunications network event records.

38. The system according to claim 36, wherein said core infrastructure is implemented as part of a credit card fraud detection system and said configurable, domain-specific implementation comprises:

thresholding rules for testing credit card event records; and profiles for comparison to credit card event records.

39. The system according to claim 36, wherein said core infrastructure is implemented as part of a data mining system and said configurable, domain-specific implementation comprises:

thresholding rules for testing data mining event records; and profiles for comparison to data mining event records.

40. The system according to claim 36, wherein said core infrastructure is implemented as part of a consumer purchasing pattern analysis system and said configurable, domain-specific implementation comprises:

thresholding rules for testing consumer purchasing event records; and profiles for comparison to consumer purchasing event records.

41. The system according to claim 36, further comprising:

a detection layer that detects and normalizes event records, dispatches event records to one or more detection engines and generates alarms when an event record meets a condition;

an analysis layer that receives alarms from said detection layer and that consolidates the received alarms into cases based upon common traits of the alarms; and an expert system layer that receives cases from said analysis layer and that acts upon certain cases.

42. The system according to claim 41, said detection layer further comprising:

means for generating feature vectors for representing multiple occurrences of an event feature.

43. The system according to claim 36, further comprising:

a presentation layer that receives cases from the detection layer, presents the received cases to human analysts, receives commands from human analysts and sends instructions to external action systems to take actions based upon the commands from human analysts.

44. A computer program product comprising a computer readable medium having computer program logic stored therein for enabling a computer system to process network event records to detect fraud and automatically generate alarms in a telecommunications system based on real-time event data and using artificial intelligence in a scalable core infrastructure with user-specific implementation rules, wherein said computer-program logic comprises:

means for enabling a computer system to test network event records;

means for enabling said computer system to generate alarms when a network event record pattern deviates from a selected profile;

means for enabling said computer system to correlate the alarms generated into categories based on known common aspects of said alarms; and means for enabling said computer system to respond to certain alarms of said categories.

45. The computer program product according to claim 44, further comprising:

means for enabling the computer to present the cases to live operators; and means for enabling the computer to permit the live operators to manually initiate responses to certain of the cases.

46. The computer program product according to claim 44, further comprising:

user configurable means for enabling the computer to process user-specific types of event records; and core infrastructure means for enabling the computer to process event records for a variety of types of event records.

47. A data processing system comprising:

normalizing means for accepting data in various formats and converting it into a predetermined formats and filtering it;

data enhancing means accepting the data in a predetermined format from the normalizing means and based upon information included in the data or extended data, deriving additional attributes to create enhanced data;

means, accepting the enhanced data from the data enhancing means, for identifying particular patterns in the enhanced data;

correlation means, accepting the filtered enhanced data from the filtering means, for correlating and consolidating the filtered enhanced data based upon predetermined criteria and obtaining additional information from external sources to generate aggregated structures; and prioritizing means, accepting the aggregated structures from the correlation means, for ordering the aggregated structures for subsequent processing.

48. The data processing system according to claim 47, further comprising presentation means for presenting the ordered aggregated structures to human analysts the presentation means accepting the ordered aggregated structures from the prioritizing means.

49. The data processing system according to claim 47, further comprising expert system means for automatically taking the appropriate action based upon the ordered aggregated structures, the expert system means accepting the ordered aggregated structures from the prioritizing means.

50. A data processing method comprising:

converting data in various formats into predetermined formats and filtering it;

creating enhanced data by deriving additional attributes from the data in a predetermined format;

filtering the enhanced data to identify particular patterns in the enhanced data;

correlating and consolidating the filtered enhanced data based upon predetermined criteria and obtaining additional information from external sources to generate aggregated structures; and prioritizing the aggregated structures for subsequent processing.

51. The data processing method according to claim 50, further comprising presenting the prioritized aggregated structures to human analysts.

52. The data processing method according to claim 50, further comprising automatically taking the appropriate action based upon the prioritized aggregated structures.

* * * * *